(12) United States Patent
Kang et al.

(10) Patent No.: US 6,590,746 B2
(45) Date of Patent: Jul. 8, 2003

(54) NEGATIVE PRESSURE AIR-LUBRICATED BEARING SLIDER

(75) Inventors: Tae-sik Kang, Seongnam (KR); No-yeol Park, Seoul (KR); Jae-won Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 49 days.

(21) Appl. No.: 09/874,018

(22) Filed: Jun. 6, 2001

(65) Prior Publication Data

US 2002/0001157 A1 Jan. 3, 2002

(30) Foreign Application Priority Data

Jun. 22, 2000 (KR) .............................. 00-34507

(51) Int. Cl.[7] .............................................. G11B 21/21
(52) U.S. Cl. .................................................. 360/236.3
(58) Field of Search ................. 360/236.3, 235.4–235.9, 360/236, 236.1–236.2, 236.4–236.9, 237

(56) References Cited

U.S. PATENT DOCUMENTS

| 4,605,977 | A | * | 8/1986 | Matthews ................. 360/234.7 |
| 5,200,868 | A | * | 4/1993 | Chapin et al. ............ 360/236.1 |
| 5,739,981 | A | * | 4/1998 | Cha et al. ................. 360/236.3 |
| 5,754,367 | A | * | 5/1998 | Chang et al. ............. 360/235.6 |
| 5,872,685 | A |   | 2/1999 | Park et al. .................... 360/103 |
| 5,917,679 | A |   | 6/1999 | Park et al. .................... 360/103 |
| 5,940,249 | A | * | 8/1999 | Hendriks ................. 360/235.6 |
| 6,004,472 | A | * | 12/1999 | Dorius et al. ................. 216/22 |
| 6,144,528 | A | * | 11/2000 | Anaya-Dufresne et al. ........ 360/235.4 |
| 6,212,033 | B1 | * | 4/2001 | Sasaki .......................... 216/47 |
| 6,229,671 | B1 | * | 5/2001 | Boutaghou et al. ...... 360/235.1 |
| 6,311,388 | B1 | * | 11/2001 | Berg et al. ............... 29/603.12 |
| 6,333,835 | B1 | * | 12/2001 | Kang et al. .............. 360/235.4 |

FOREIGN PATENT DOCUMENTS

JP    10283745 A    10/1998

* cited by examiner

*Primary Examiner*—William Korzuch
*Assistant Examiner*—Angel Castro
(74) *Attorney, Agent, or Firm*—Burns, Doane, Swecker & Mathis, L.L.P.

(57) ABSTRACT

A negative pressure air-bearing slider includes a body flying in a first direction along a track of a disc where information is recorded while being raised to a predetermined height, a plurality of rails provided at the bottom of the body corresponding to a surface of the disc, an air inflow channel arranged at the bottom of the body in the first direction and having an air inflow portion at the leading end portion of the slider and an air exhaust portion at the inside of the body, and a pair of negative pressure recess portions provided at the air exhaust portion of the air inflow channel to be arranged in a second direction perpendicular to the first direction with respect to the air inflow channel. Thus, a constant flying height is maintained in the overall area of a disc. A pitch angle is maintained within an appropriate range in the overall area of a disc. The size of the roll angle is minimized in the overall area of a disc and maintained to be constant. In particular, dynamic stability is provided to the external interference and track seek and the amount of contaminant particles intruding into the head-disc interface is minimized, so that a phenomenon in which the intruding contaminant particles are accumulated in the negative pressure recess portions can be effectively prevented.

19 Claims, 19 Drawing Sheets

NEGATIVE PRESSURE AIR-LUBRICATED BEARING SLIDER

This application claims priority under 35 U.S.C. §119 and/or 365 to 00-34507 filed in Republic of Korea on June 22, 2000; the entire content of which is hereby incorporated by reference.

BACKGROUND OF THE INVENTION

1. Field of the Invention

The present invention relates to a negative pressure air-lubricated bearing slider in a magnetic recording apparatus, where a magnetic transducer is installed, and more particularly, to a slider in which flying stability is improved.

2. Description of the Related Art

In a magnetic recording apparatus, a slider flies above a disc by using air as a lubricant. FIG. 1 shows the structure of a hard disc drive (HDD) as an example of the magnetic recording apparatus.

Referring to the drawing, in a driving apparatus of a hard disc drive 10, a disc 11 placed on a spindle motor 12 rotates and a negative pressure air-lubricated bearing slider 14 is attached at a suspension 15 to correspond to the magnetic disc 11. The negative pressure air-lubricated bearing slider 14 is moved by an actuator 16 which pivots so that the slider 14 moves to a desired position on a track 13 of the disc 11. The disc 11 used as a recording medium has a circular shape and different information is recorded on each track 13. Accordingly, to obtain desired information, the slider 14 moves in search of a corresponding track on the disc 11. Here, a linear velocity and skew angle change according to the position of the track 13 and accordingly the flying height, a pitch angle, a roll angle of the slider 14 are changed.

Referring to FIGS. 2A, 2B and 2C, linear velocity 25 generated due to rotation of the disc 11 changes in proportion to the radius of the disc 11 at each of the tracks having different radii. Thus, the flying attitude of the slider 14, that is, a flying height 21, a pitch angle 22, and a roll angle 23, changes according to the position of each track.

The flying height 21 means the height between the slider 14 and the disc 11 at a position where a magnetic transducer 26 for recording/reproducing information. The pitch angle 22 means an angle made by the lengthwise direction of the slider 14 and the surface of the disc 11. The roll angle 23 means an angle made by the widthwise direction of the slider 14 and the surface of the disc 11. The skew angle 24 means an angle made by a tangent of a track of the disc 11 and a lengthwise direction 15 of the slider 14. The skew angle 24 greatly affects generation of pressure to a bearing so that the flying attitude, that is, the flying height 21, the pitch angle 22, and the roll angle 23, changes much according to the radius of the disc 11.

Since about 2–3 micro inches or more is conventionally required for the flying height, even when the amount of a change in the flying height is somewhat great, such a change does not affect recording and reproducing of information. However, as the flying height is recently lowered to 1 micro inch or less, the range of a change in the flying height becomes small and stable flying is needed. When the range of a change in the flying height is great, recording and reproducing of information is difficult and collisions between the slider and the disc are frequently made so that durability and reliability of the whole system are lowered.

The relationship between a head writing field (Hw) and the coercivity (Hc) of a recording medium is expressed by the following equation.

$$Hw = a \times Hc \qquad \text{[Equation 1]}$$

In Equation 1, when it is assumed that the coercivity of a recording medium fixed, the size of the head writing field is determined by a value a. As the value a decreases, the head writing field is reduced. This means that a head with a small writing field can sufficiently record information on a recording medium. The value a is related to the flying height that is a gap between the slider and the disc. Thus, the value a can be reduced by reducing the flying height. When the flying height is lowered, the size of bits related to a recording density is reduced so that a greater amount of information can be stored.

While the recording density increases as the flying height is lowered, the possibility that the slider collides with the disc by external interferences such as an outside impact, increases. To prevent this problem, various slider shapes have been suggested.

FIG. 3 shows the structure of a slider having a conventional shape which is disclosed in U.S. Pat. No. 3,823,416, which is the same as those shown in FIGS. 2A, 2B and 2C.

Referring to FIG. 3, rails 31a each having a taper 32a are formed at both sides on the bottom surface of a slider parallel to each other in the lengthwise direction. The slider having this shape is basically used in an initial form of a magnetic recording apparatus, and is named a taper flat (TF) slider. This slider is disadvantageous in that the flying height, the pitch angle, and the roll angle change very greatly with respect to changes in the disc linear velocity and the skew angle which are described above with reference to FIGS. 2A, 2B, and 2C. Since a magnetic transducer 26 is disposed at the rear of one rail at the back of the slider, the flying height is greatly affected by not only a change in the pitch angle, but also a change in the roll angle, so that it is difficult to maintain a constant flying height with respect to the radius of a disc.

The reasons for using the taper flat slider in spite of the above problems are as follows. First, since a linear actuator is mainly used instead of a rotary actuator, there is no need to consider an effect by the skew angle. Second, since the flying height is 4 micro inches or more, even when the amount of a change in the flying height with respect to the radius of a disc is large, recording and reproducing of information are not affected much.

FIG. 4 shows the structure of a slider which is disclosed in U.S. Pat. No. 5,473,485. Referring to the drawing, rails 31b each having a taper 32b at the front side of the slider are formed at both sides on the bottom surface of the slider to the middle portion of the slider. A pad 33b is formed in the middle of the rear side of the slider. The slider having the above structure is named a tri-pad slider and exhibits a stable flying attitude compared to the conventional taper flat slider.

However, as a need for a high density recording apparatus increases, the flying height between the slider and the disc is drastically reduced to 2 micro inches or less. A slider for generating negative pressure which enables a stable flying attitude with respect to the external interferences has been suggested.

FIG. 5 shows a negative pressure air-lubricated bearing slider disclosed in U.S. Pat. No. 3,855,625 which is named a zero-load slider.

Referring to FIG. 5, rails 31c are formed at both sides on the bottom surface of a slider parallel to each other. A bridge 35c is formed at the middle portion between both rails 31c to section the space between both rails 31c into a positive pressure space portion 33c and a negative pressure space portion 34c.

The feature of the negative pressure slider having the above structure is as follows. Positive pressure that lifting the slider above the disc is generated at the positive pressure space portion 33c. Negative pressure corresponding to the positive pressure is generated at the negative pressure space portion 34c between air-bearing surfaces (ABS). According to the above structure, a suction force toward the disc is generated to the slider due to the negative pressure generated at the negative pressure space portion 34c so that great stiffness of an air bearing is formed while having light external load. However, in such a negative pressure slider, since the amount of a change in the roll angle is greatly generated according to a change in the skew angle, the flying height at the position where a magnetic transducer 26 is installed is much affected so that recording/reproducing is not performed properly. Also, in the case, in which a change with respect to roll, such as, track seek motion or lamp loading, is great, dynamic stability in a direction of rolling is lowered.

To obtain a stable flying feature, the following conditions are required to be met.

First, the flying height must be maintained to be constant with respect to the radius of a disc. That is, the flying height of a slider should not be changed regardless of a change in the speed of air flow and a skew angle in the entire area of a disc from the inner side to the outer side of the disc. As the flying height is recently very low (less than 1 micro inch), this condition should be sternly met Second, the size of a pitch angle made by the slider should be included within a proper range regardless of the radius of the disc. If the pitch angle is too small, a crash that is a collision between the front portion of the slider and the disc, is generated, resulting in severe damage to the disc. Also, a sufficient wedge effect is not obtained so that a dynamic stiction, in which the slider is sucked to the disc during the operation, is generated. When the pitch angle is too great, the stiffness of an air bearing is not sufficiently maintained so that the dynamic stability of the slider is lowered.

Third, the change in the roll angle of the slider within the entire area of the disc in the radial direction should be small. Since the flying height is measured at the center of the rear of the slider, the flying height is not changed much by the roll angle. However, considering track seek and dynamic stability in a roll direction with respect to the external moment in the roll direction, the roll angle should always be a stable small value.

Fourth and the last, by providing a shape which enable negative pressure to be generated in a sufficient amount, the stiffness of an air bearing is maximized. To minimize a change in the flying height with respect to an error in assembly of a magnetic recording apparatus, an error in the size of suspension load, and an error in manufacturing the air bearing surface, the stiffness of the air bearing should be maximized.

SUMMARY OF THE INVENTION

To solve the above problems, it is a first object of the present invention to provide a negative pressure air-lubricated bearing slider in which the flying height is maintained uniformly in the entire area of a disc.

It is a second object of the present invention to provide a negative pressure air-lubricated bearing slider in which the pitch angle is maintained within an appropriate range in the entire area of a disc.

It is a third object of the present invention to provide a negative pressure air-lubricated bearing slider in which the size of a roll angle is minimized in the entire area of a disc.

It is a fourth object of the present invention to provide a negative pressure air-lubricated bearing slider which provides dynamic stability with respect to the outer interference and the track seek.

It is a fifth object of the present invention to provide a negative pressure air-lubricated bearing slider which minimizes the amount of contaminant particles intruding into a head-disc interface (HDI) and effectively prevents accumulation of the intruding contaminant particles in a negative pressure space portion.

Accordingly, to achieve the above objects, there is provided a negative pressure air-bearing slider comprising a body flying in a first direction along a track of a disc where information is recorded while being raised to a predetermined height, a plurality of rails provided at the bottom of the body corresponding to a surface of the disc, an air inflow channel arranged at the bottom of the body in the first direction and having an air inflow portion at the leading end portion of the slider and an air exhaust portion at the inside of the body, and a pair of negative pressure recess portions provided at the air exhaust portion of the air inflow channel to be arranged in a second direction perpendicular to the first direction with respect to the air inflow channel.

It is preferred in the present invention that a first rail base having a W shape which is disposed at the front side of the slider in the first direction, encompassing the negative pressure recess portion pair, and having a protruding portion extending between the negative pressure recess portions at the center of the slider, and the first rail corresponding to each of the negative pressure recess portions is provided on the first rail base.

It is preferred in the present invention that an upper surface of the protruding portion is disposed lower than the first rail, and the air inflow channel is provided at the upper surface of the protruding portion.

It is preferred in the present invention that the first rail is formed on a portion of the upper surface of the first rail base, and a front stepped portion is provided at the upper surface of the first rail base at the leading end portion of the first rail.

It is preferred in the present invention that the first rail is formed on a portion of the upper surface of the first rail base, and a rear stepped portion is provided at the upper surface of the first rail base in the rear of the first rail facing the negative pressure recess portions.

It is preferred in the present invention that a second rail base is provided in the rear of each of both sides of the first rail base at a constant interval, and a second rail is provided at each of the second rail bases.

It is preferred in the present invention that a third rail is provided between the second rails.

It is preferred in the present invention that the second rail is separated a predetermined distance from the read end of the body.

It is preferred in the present invention that an inclined portion is formed at each corner of both sides of the front side of the first rail base.

According to another preferred embodiment of the present invention, to achieve the above objects, there is provided a negative pressure air-bearing slider comprising a body, a first rail, provided at the leading end portion of the body in a first direction, having a pair of first portions arranged at both sides in the first direction, a second portion in a second direction of which both ends are connected to the leading end portions of the first portions, and an air inflow channel in the first direction provided at the central portion of the second portion, in which a pair of negative pressure recess portions are provided at both sides in the second direction at a predetermined interval with respect to the air inflow channel in an inner space between the first portions and the second portions, and a pair of second rails provided at both sides of the rear of the body of the slider in the first direction.

It is preferred in the present invention that a third rail disposed at the central portion of the rear side in the first direction is interposed between the second rails.

It is preferred in the present invention that the first rails have a protruding portion having a predetermined height at the middle portion thereof and are formed at both sides of a first rail base having a W shape and encompassing the negative pressure recess portions, and the air inflow channel is provided on the upper surface of the protruding portion of the first rail base.

It is preferred in the present invention that the first rail is formed on a portion of the upper surface of the first rail base, and a stepped portion is formed by the upper surface of the first rail base where the first rail is not formed at any of the front and rear sides of the first rail.

It is preferred in the present invention that the length of the protruding portion has a value not more than 70% of the length of the body.

BRIEF DESCRIPTION OF THE DRAWINGS

The above objects and advantages of the present invention will become more apparent by describing in detail preferred embodiments thereof with reference to the attached drawings in which:

FIGS. 2A through 2C are views showing the head-disc interface, in which

FIG. 2A is a perspective view,

FIG. 2B is a side view, and

FIG. 2C is a rear view;

DETAILED DESCRIPTION OF THE INVENTION

Figure 1:
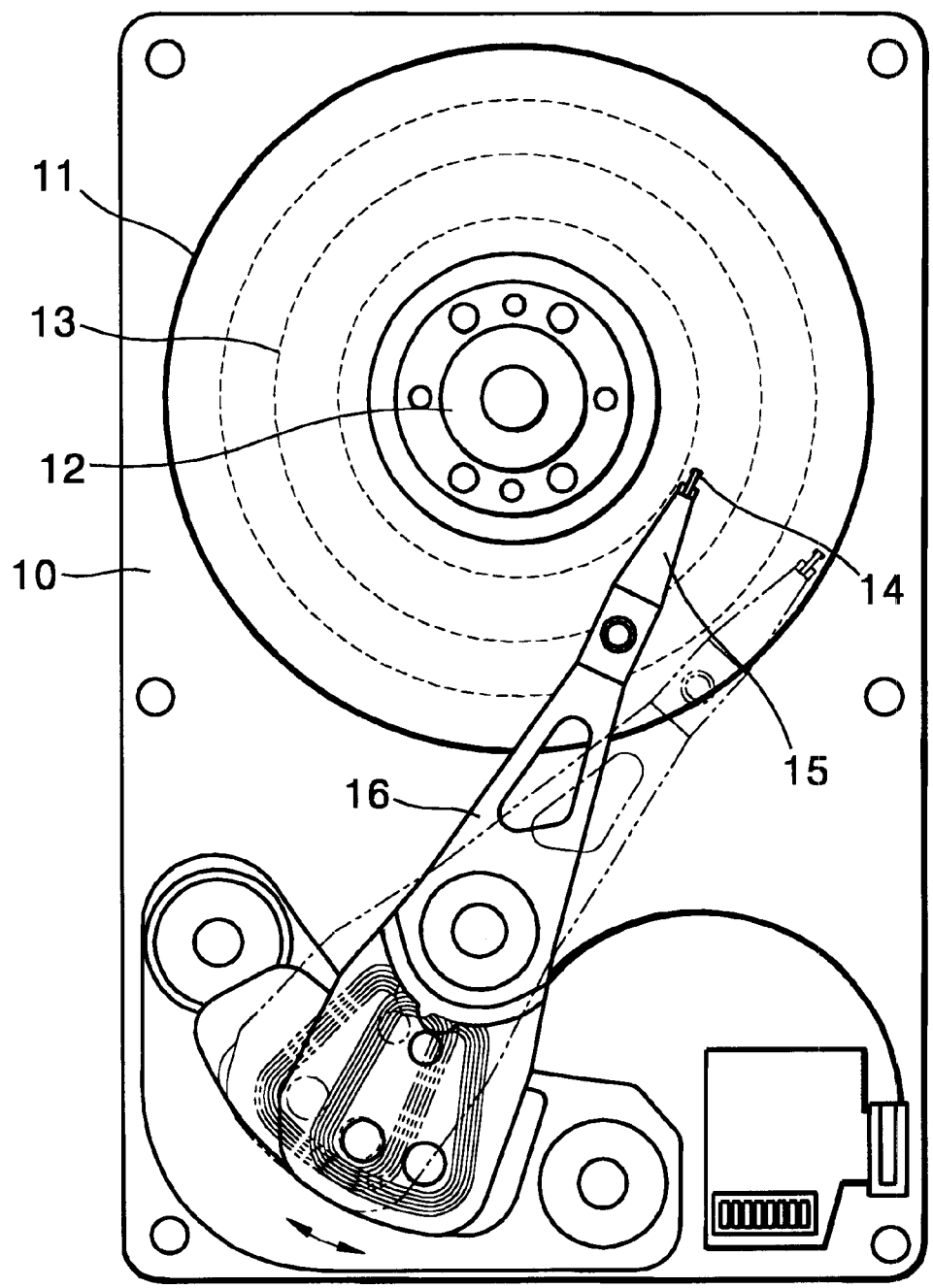
FIG. 1 is a plan view showing the structure of the inside of a typical hard disc drive (HDD)
Figure 2A:
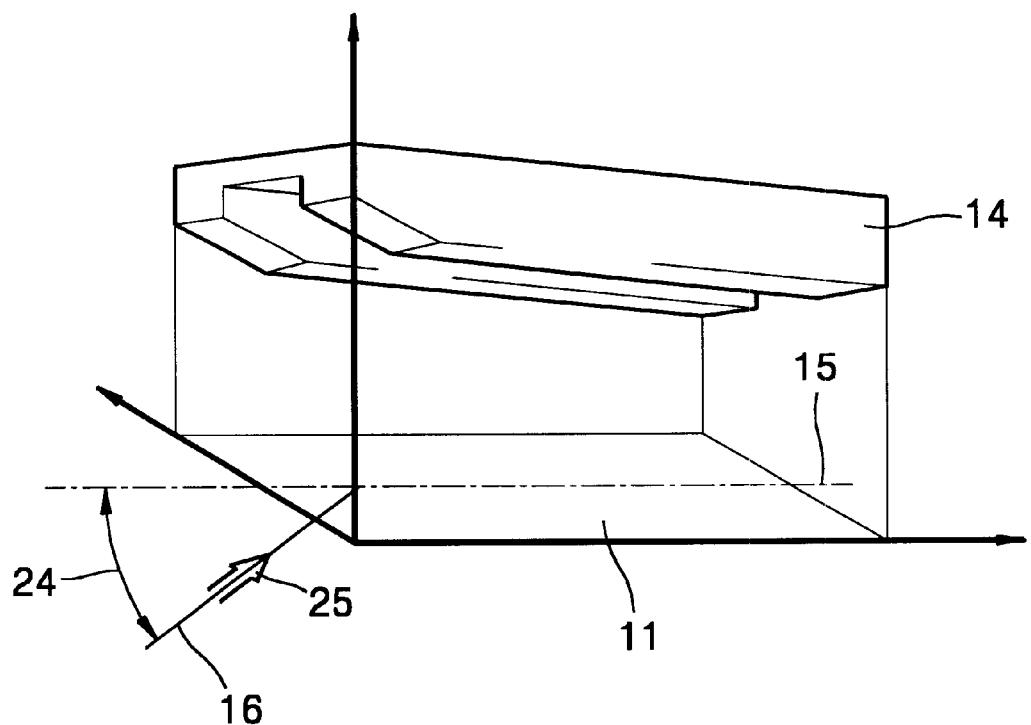
Figure 2B:
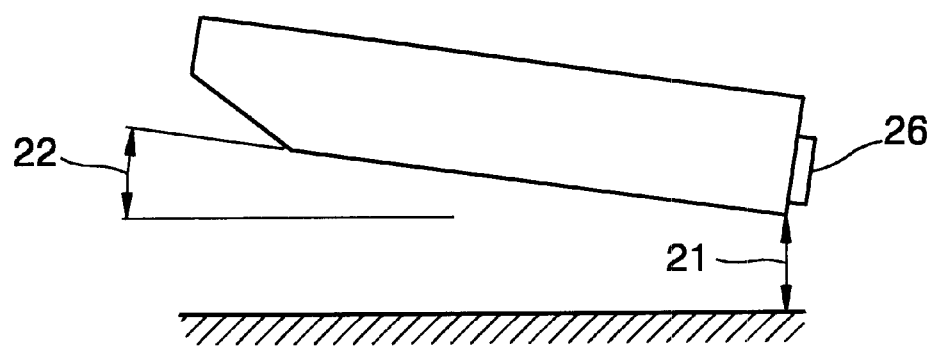
Figure 2C:
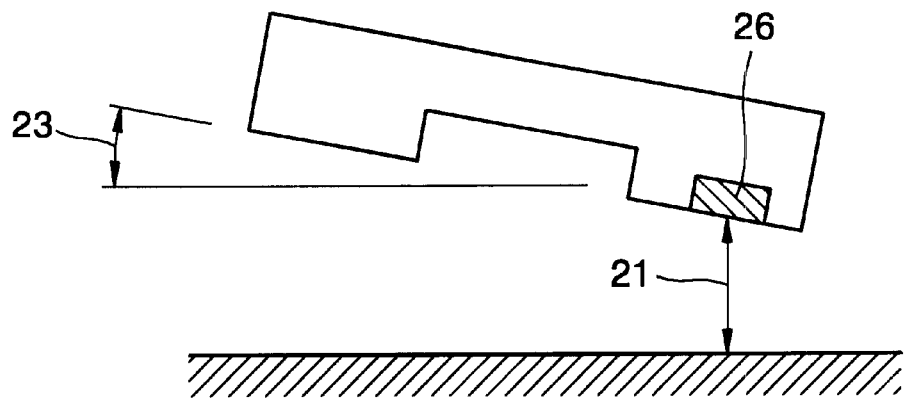
Figure 3:
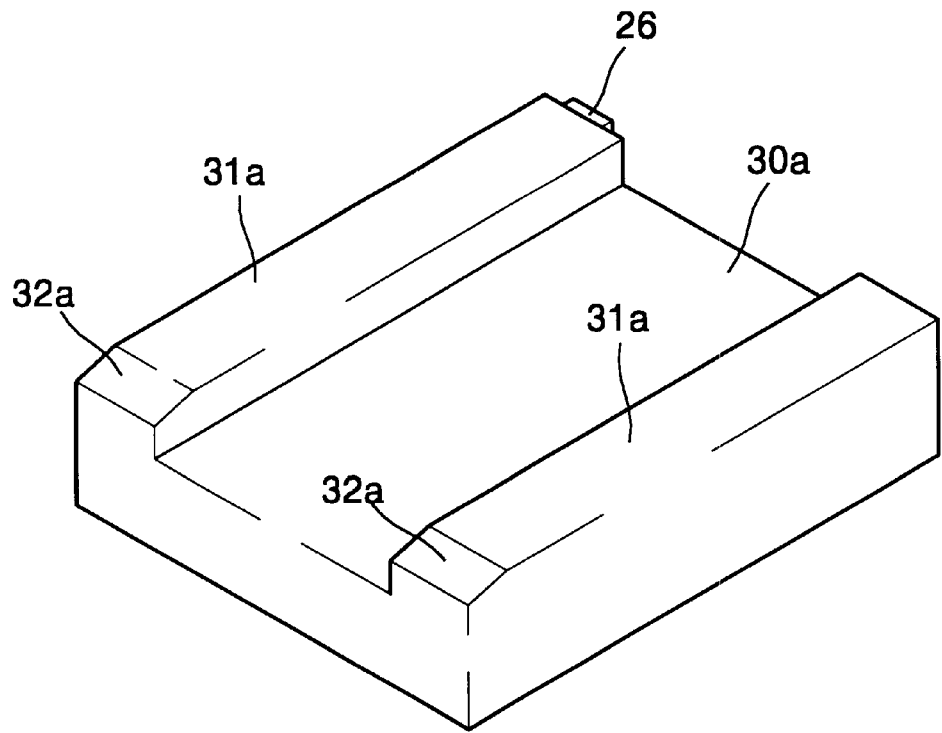
FIG. 3 is a perspective view showing the conventional taper flat slider.
Figure 4:
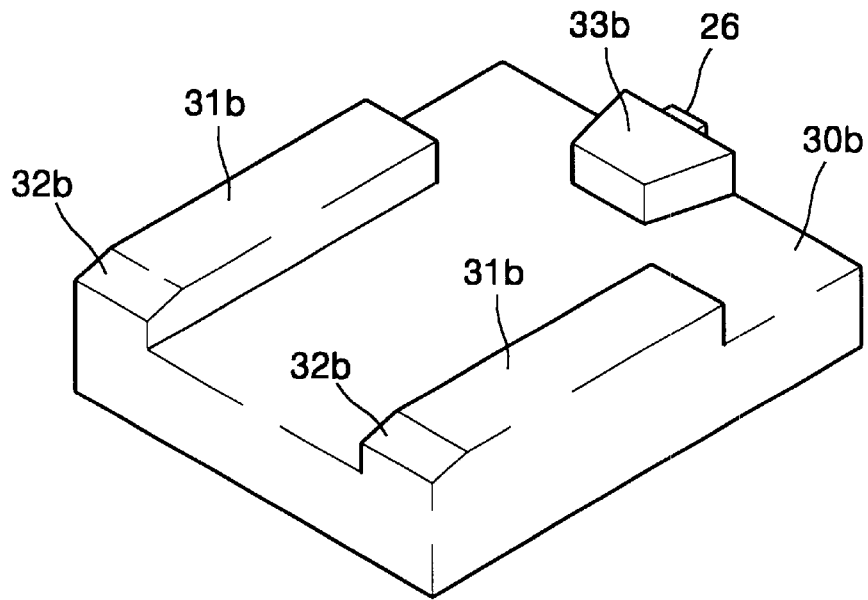
FIG. 4 is a perspective view showing the conventional try-pad slider.
Figure 5:
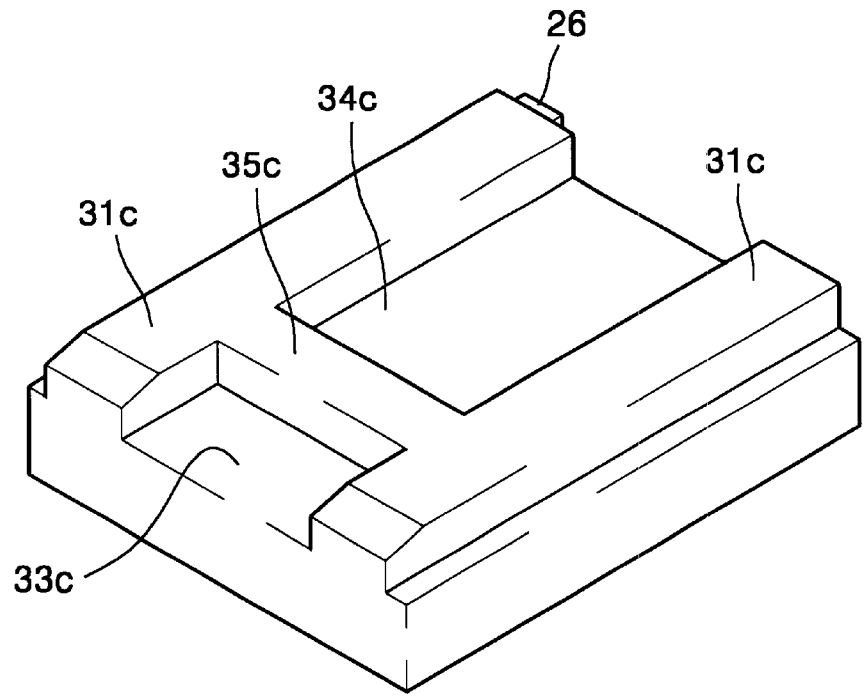
FIG. 5 is a perspective view showing the zero-load slider which is one of the conventional negative pressure air-lubricated sliders.
Figure 6:
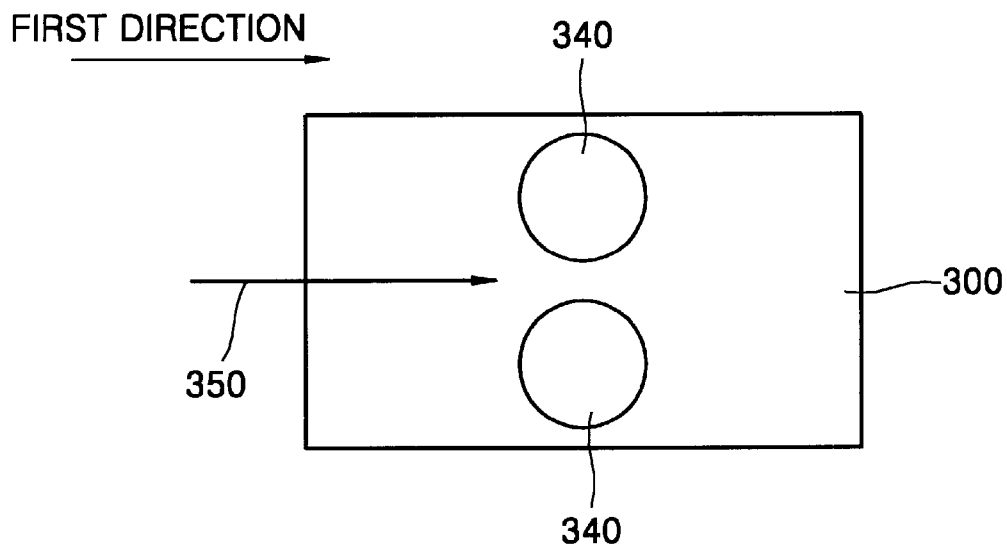
FIG. 6 is view showing the structural features of a negative pressure air-bearing slider according to the present invention.

Referring to FIG. 6, a negative pressure air-bearing slider according to the present invention includes a body 300 flying in the first direction while flying at a predetermined height along a track of a disc where information is recorded. Here, the flying means that the body 300 which is raised by a positive pressure generated as the disc rotates has a relative speed while maintaining a predetermined distance from the track of the disc. Actually, the body 300 is supported by a suspension and a track corresponding to the body 300, in particular, the disc, rotates. An air inflow channel 350 is provided at the middle portion of the leading portion of the body 300 at the upstream position parallel to the first direction. An air inflow portion of the air inflow channel 350 faces the front side of the body 300 while an air exhaust portion of the air inflow channel 350 at the downstream position faces the inside of the body 300. The air inflow channel 350 which is a path through which air flows is provided by rails which will be described later. A pair of negative pressure recess portions 340 are provided at the bottom of the body 300. The negative pressure recess portions 340 are disposed at a particular interval in the second direction perpendicular to the first direction. Here, the second direction is a direction along which track seek is performed. These negative pressure recess portions 340 are arranged close to the air exhaust portion of the air inflow channel 350 arranged in the first direction. The negative pressure recess portions 340 can maintain the roll angle to be stable in the track seek direction and in particular, the stiffness of air-bearing with respect to the outside interference is increased.

The detailed structures of the negative pressure air-bearing sliders adopting the above concept according to preferred embodiments of the present invention will be described as follows.

Figure 7A:
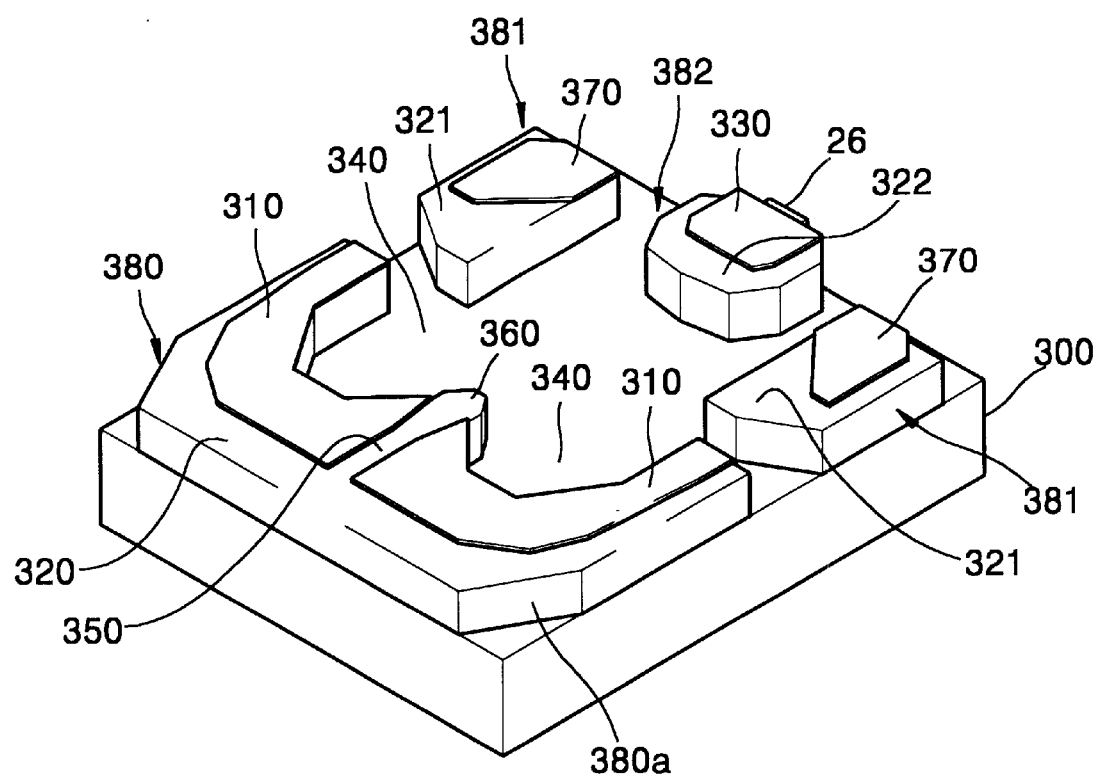
FIG. 7A is a perspective view showing a negative pressure air-bearing slider according to a first preferred embodiment of the present invention.
Figure 7B:
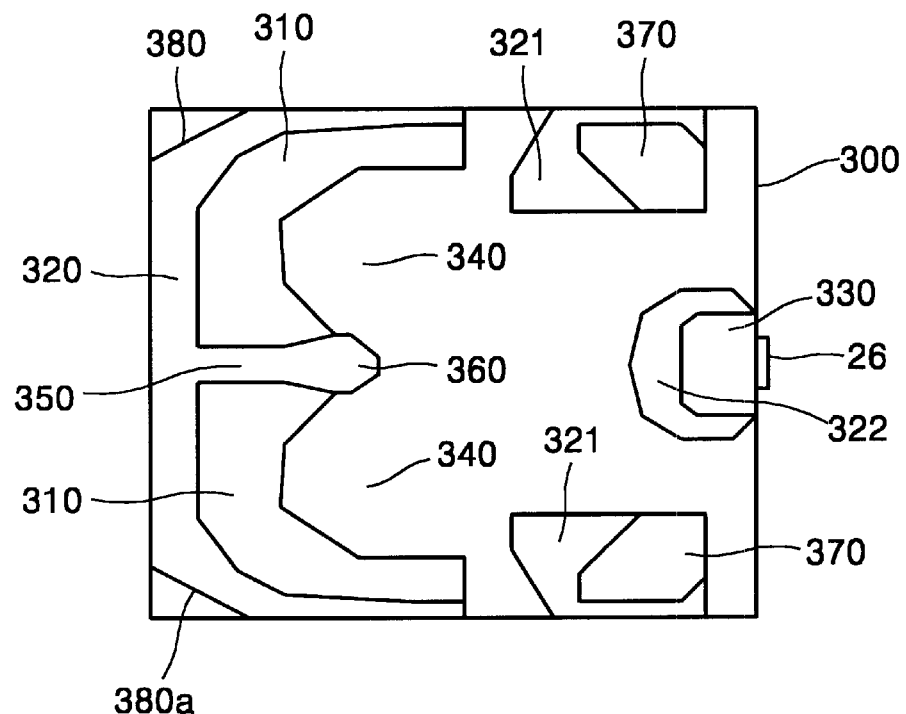
FIG. 7B is a plan view showing the negative pressure air-bearing slider of FIG. 7A.

FIGS. 7A and 7B show a negative pressure air-bearing slider according to a first preferred embodiment of the present invention. Referring to the drawings, five rails 310, 310, 370, 370, and 330 for generating positive pressure and a pair of negative pressure recess portions 340 for generating negative pressure are provided at the bottom of the body 300 of the negative pressure air-bearing slider according to the first preferred embodiment of the present invention.

The body 300 of the slider has a lubricating surface facing the disc and the lubricating surface is formed of rails and recesses. The lubricating surface is formed of first, second, and third rails 310, 370, and 330.

A pair of the first rails 310 are provided and these two rails 310 are formed to be lengthy in the lengthwise direction of the slider at the side portions of the body 300 so as to form a negative pressure recess portion. The first rails 310 are formed on a first rail base 380 which forms a bay at large.

In detail, a pair of first rails 310 are arranged at the leading portion of the body 300 and the air inflow channel 350 is provided between the first rails 310. The first rails 310 and the air inflow channel 350 are formed on a first rail base 380 which is formed on the body 300 at a predetermined height. The first rail base 380 has a W shape and can be considered as part of the first rail 310. The first rail base 380 provides the negative pressure recess portions 340 which are sufficiently and appropriately adjusted. A protrusion 360 extending a predetermined length from the first rail base 380 between the negative pressure recess portions 340 spatially separates the negative pressure recess portions 340 so that pressure in each of the negative pressure recess portions 340 can be appropriately maintained.

Among the five rails for generating positive pressure, the first rails 310 disposed at the leading portion maintain the pitch angle to be uniform to prevent collision with the disc. Second rails 370 are disposed in the rear of the first rails 310. The second rails 370 increase stability in roll by increasing roll stiffness of the slider. A third rail 330 is provided between the second rails 370 and a magnetic transducer 26 for recording/reproducing information is installed at one side of the third rail 330. The second rails 370 and the third rail 330 are respectively formed on the surfaces of second and third rail bases 381 and 382 having a predetermined height, each being in a predetermined area, like the first rails 310.

The first, second, and third rails 310, 370, and 330 are formed on the rail bases 380, 381, and 382, respectively, to occupy smaller areas than those of the rail bases 380, 381, and 382. Thus, stepped portions 320, 321, and 322 are formed in narrow areas near the first, second, and third rails 310, 370, and 330. The stepped portions 320, 321, and 322 are formed to sufficiently encompass the respective rails 310, 370 and 330, providing a pressure forming mechanism using a wedge effect. By using these steps, manufacturing of the slider is made easy compared to the conventional taper mechanical processing and a manufacturing error generated during the taper processing can be minimized.

The negative pressure recess portions 340 is substantially divided into two by the protrusion 360 extending toward the rear end of the slider from the stepped portion 320 disposed on the first rail base 380. By forming these two negative pressure recess portions 340, a generating large suction force regardless of a change in a skew angle makes the slider become more stable.

The second rails 370 generate sufficient positive pressure by the wedge effect of the stepped portion 321 and improve stability in the roll direction. The third rail 330 at the rear end portion surrounded by the stepped portion 322 generates sufficient pressure. When the flying height is too low, the third rail 330 generates great pressure so that a great repulsive force is generated and the slider is raised higher.

According to the present invention, four stable pressures are formed by the first rails 310 and the second rails 370 at the rear side so that the slider maintains a more stable flying stiffness. Since the negative pressure recess portions 340 generate great negative pressure, great stiffness of air-bearing is maintained.

In the above structure, the rails and rail bases are formed to be symmetrical to the left and right with respect to the body in the first direction. In some cases, it is possible that the rails and rail bases are formed asymmetrical.

As shown in FIGS. 7A and 7B, the second rail base 381 maintains a predetermined distance from the read end portion of the body 300. The first rail base 380 does not extend toward the corner of the body 300 and an inclined portion 380a of the first rail base 380 is formed to be inclined with respect to the first direction. Thus, even a roll action occurs largely on the body 300, the collision between the first rail base 380 and the disc is prevented. The amount of intrusion of contaminants into a portion between the disc and the body including the negative pressure recess portion 340 is reduced.

As described above, most of the positive pressure is generated at the four corners 310 and 370 of the slider and the rear end 330 of the slider while the negative pressure is generated at the center of the slider where the negative pressure recess portion 340 exists. The above generation of the pressures minimizes the amount of a change in the flying height 21, the pitch angle 22, and the roll angle 23 of the slider regardless of the position of a track across the disc. Maintaining a very low flying height and simultaneously obtaining a stable flying attitude provide reliability to a head-disc interface.

Figure 8A:
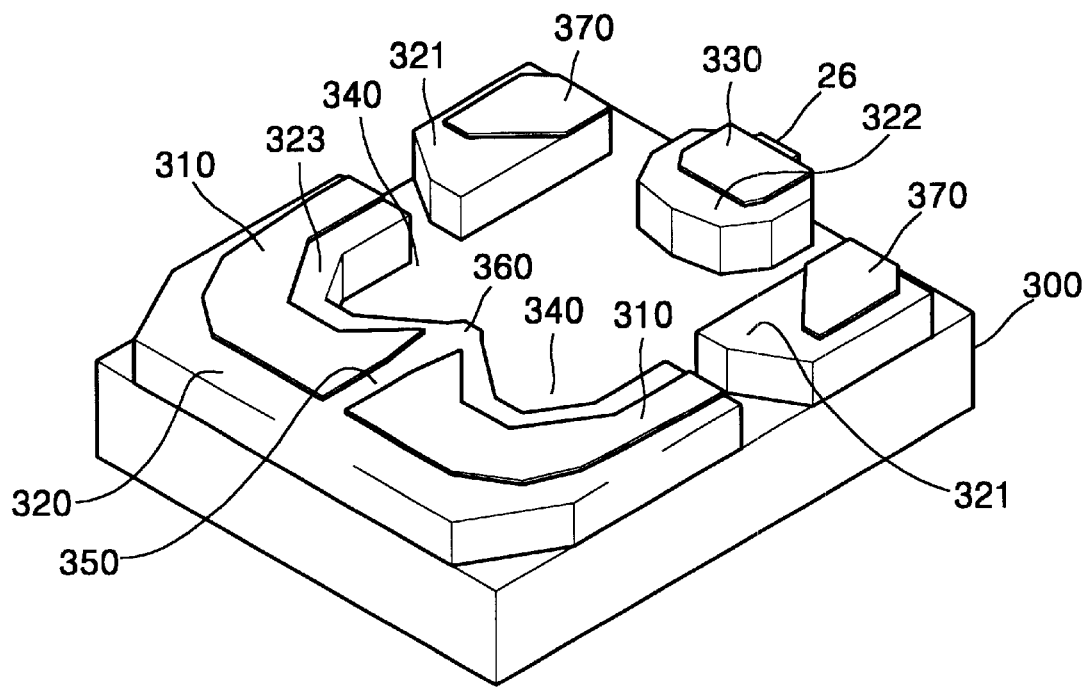
FIG. 8A is a perspective view showing a negative pressure air-bearing slider according to a second preferred embodiment of the present invention.
Figure 8B:
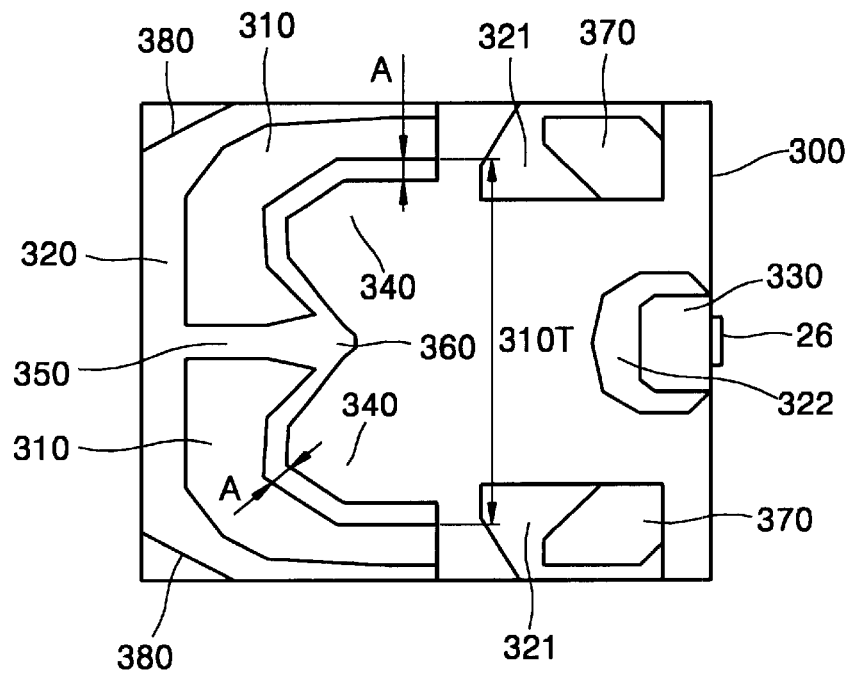
FIG. 8B is a plan view showing the negative pressure air-bearing slider of FIG. 8A.

FIGS. 8A and 8B show a negative pressure air-bearing slider according to a second preferred embodiment of the present invention. Here, the same reference numerals are used for the same elements described with reference to FIGS. 6, 7A and 7B, other than a stepped portion 323 adjacent to the negative pressure recess portions 340. The descriptions of the elements previously described will be omitted.

In the second preferred embodiment shown in FIGS. 8A and 8B, the protruding portion 360 provided at the first rail base 380 of the first preferred embodiment shown in FIGS. 7A and 7B changes slightly and an inner stepped portion 323 formed inside the first rail base 380 and close to the negative pressure recess portion 340 is added.

In the second preferred embodiment, the inner stepped portion 323 of the first rail base 380 formed at the rear of the first rail to be close to the negative pressure recess portions 340 minimizes an accumulation of fine contaminant particles generated due to a rapid change in pressure at the negative pressure recess portions 340.

Figure 9:
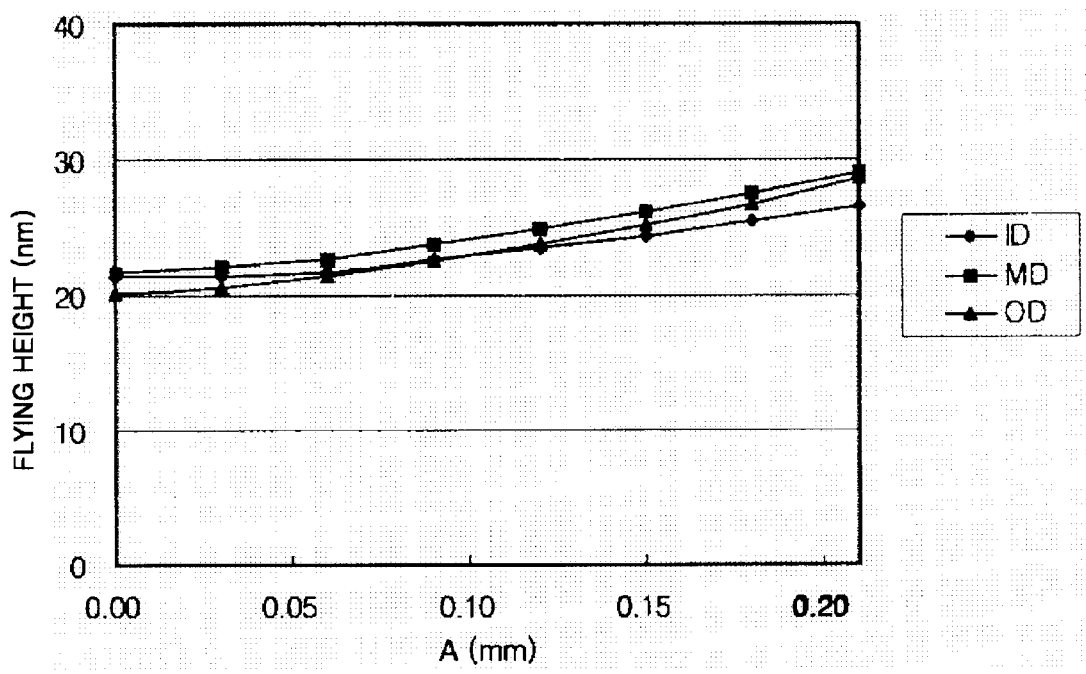
FIG. 9 is a graph showing the relation between a change in the width A of the front stepped portion provided at the negative pressure air-bearing slider according to the present invention and a change in the flying height at each of track positions on the disc.
Figure 10:
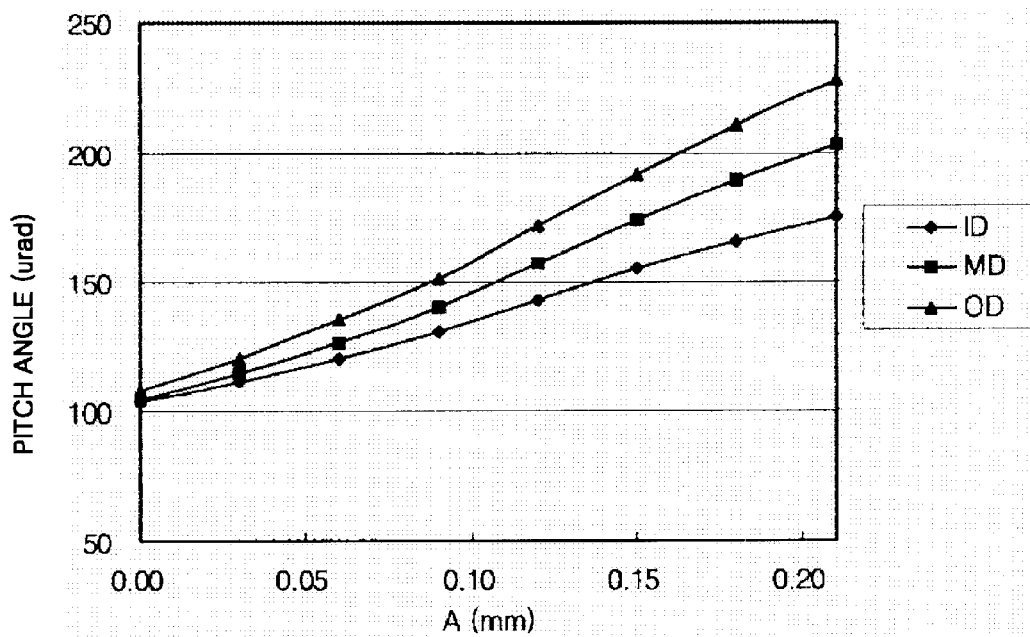
FIG. 10 is a graph showing the relation between a change in the width A of the front stepped portion provided at the negative pressure air-bearing slider according to the present invention and a change in the pitch angle at each of track positions on the disc.
Figure 11:
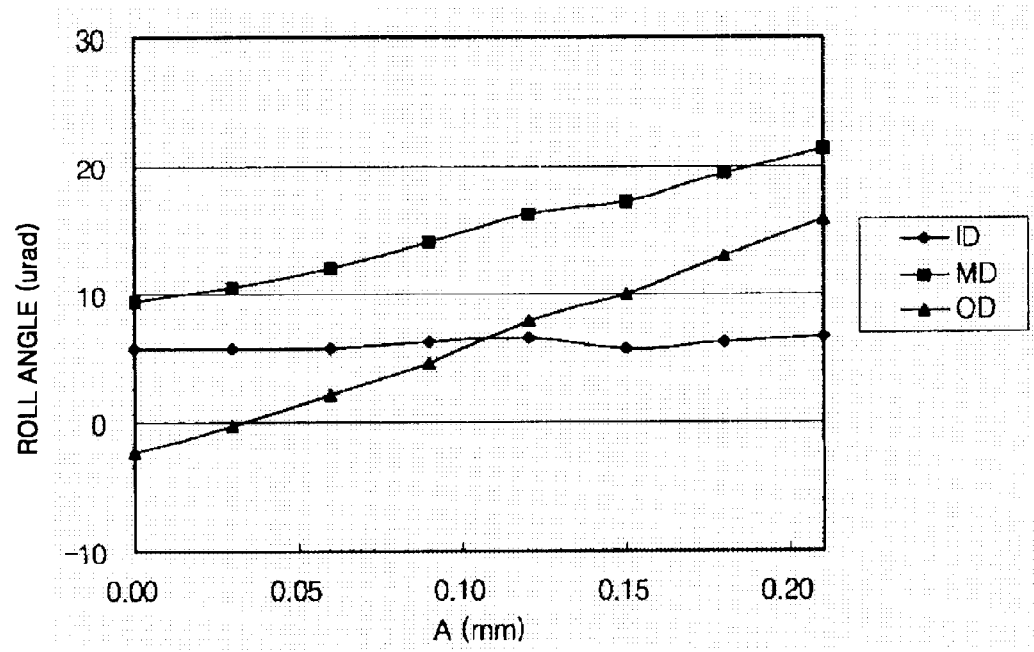
FIG. 11 is a graph showing the relation between a change in the width A of the front stepped portion provided at the negative pressure air-bearing slider according to the present invention and a change in the roll angle at each of track positions on the disc.

FIGS. 9 through 11 show the flying property of the slider with respect to the width A of the inner stepped portion 323 in the second preferred embodiment of the present invention.

As shown in FIGS. 9 through 11, as the width A increases, the amount of negative pressure generated in the negative pressure recess portions 340 is lowered, so that the flying height, the pitch angle, and the roll angle concurrently increase. Thus, the width A should not be excessively large and an appropriate width A is limited within 25% of the distance 310T between the first rails 310. In FIGS. 9 through 11, ID (inner diameter), MD (middle diameter), and OD (outer diameter) respectively indicate the innermost diameter, the middle diameter, and the outermost diameter of the disc where magnetic information is stored.

Figure 12A:
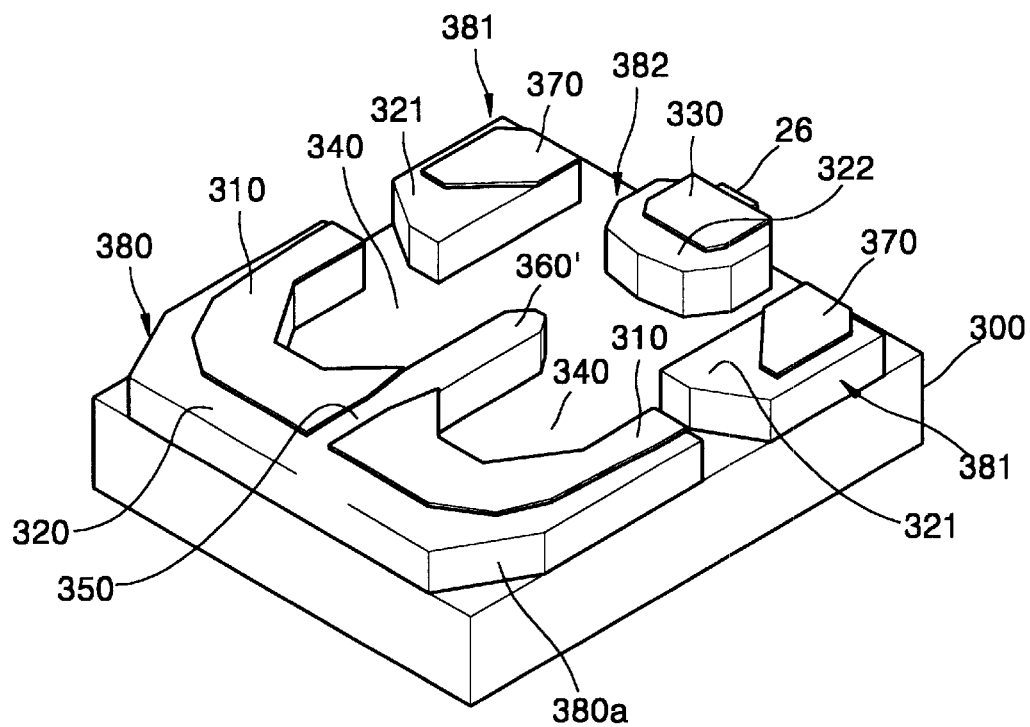
FIG. 12A is a perspective view showing a negative pressure air-bearing slider according to a third preferred embodiment of the present invention.
Figure 12B:
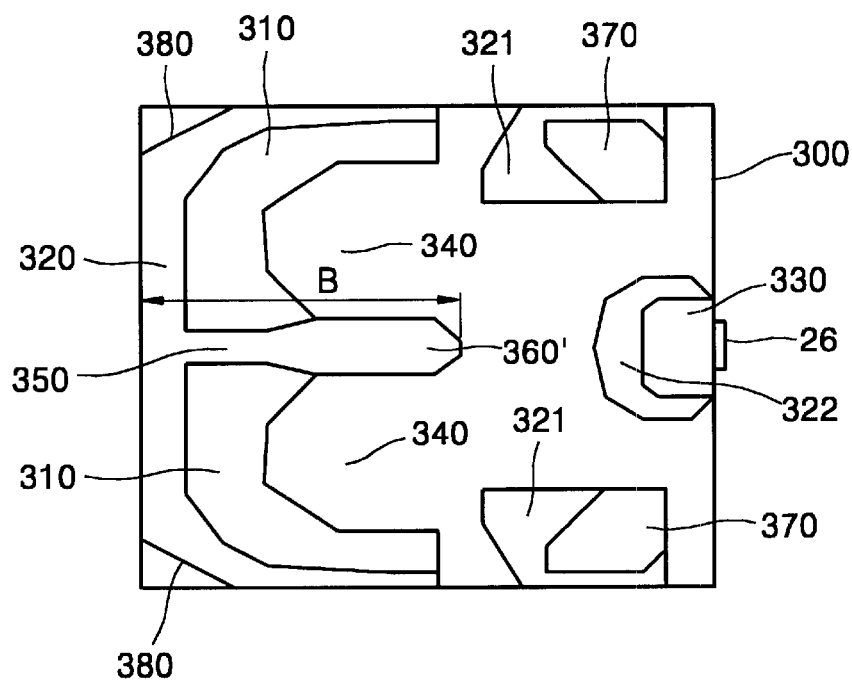
FIG. 12B is a plan view of the negative pressure air-bearing slider of FIG. 12A.

FIGS. 12A and 12B show a negative pressure air-bearing slider according to a third preferred embodiment of the present invention. The preferred embodiment has substantially the same structure as that of the first preferred embodiment except for a protruding portion 360'. As shown in the drawings, the protruding portion 360' extending from the stepped portion 320 provided at the outside of the first rail base 380 is longer than the above-described protruding portion 360 of the first and second preferred embodiments. The protruding portion 360' separates the negative pressure recess portions 340 and the amount of pressure with respect to the length does not much change.

Figure 13:
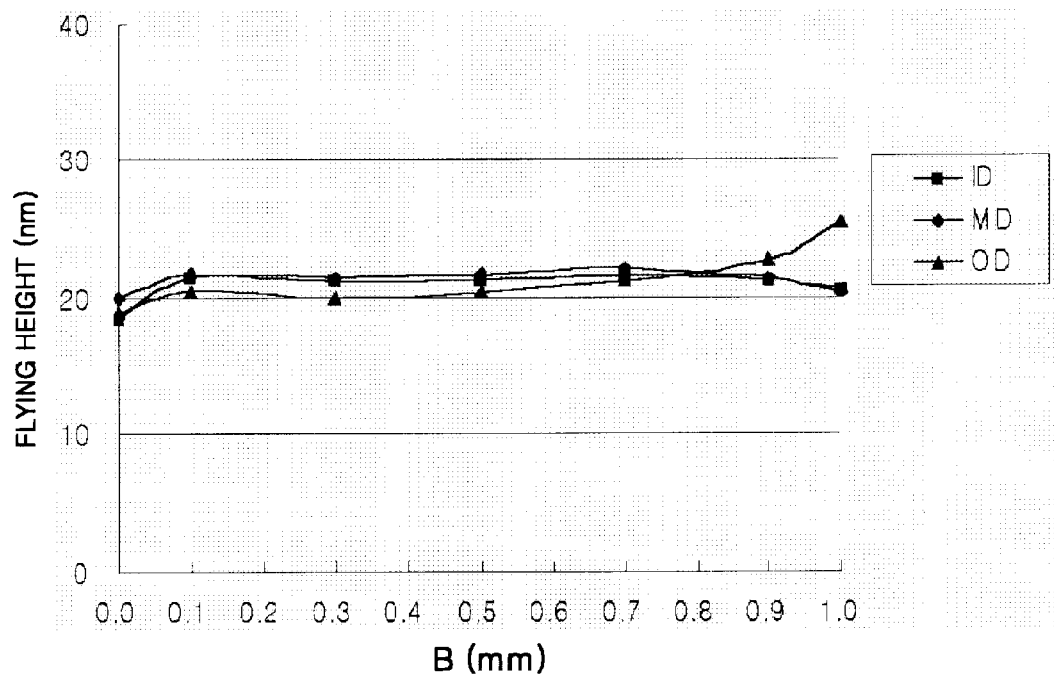
FIG. 13 is a graph showing the relation between a change in the flying height and a change in the length B of the protruding portion in the negative pressure air-bearing slider according to the third preferred embodiment of the present invention shown in FIGS. 12A and 12B.
Figure 14:
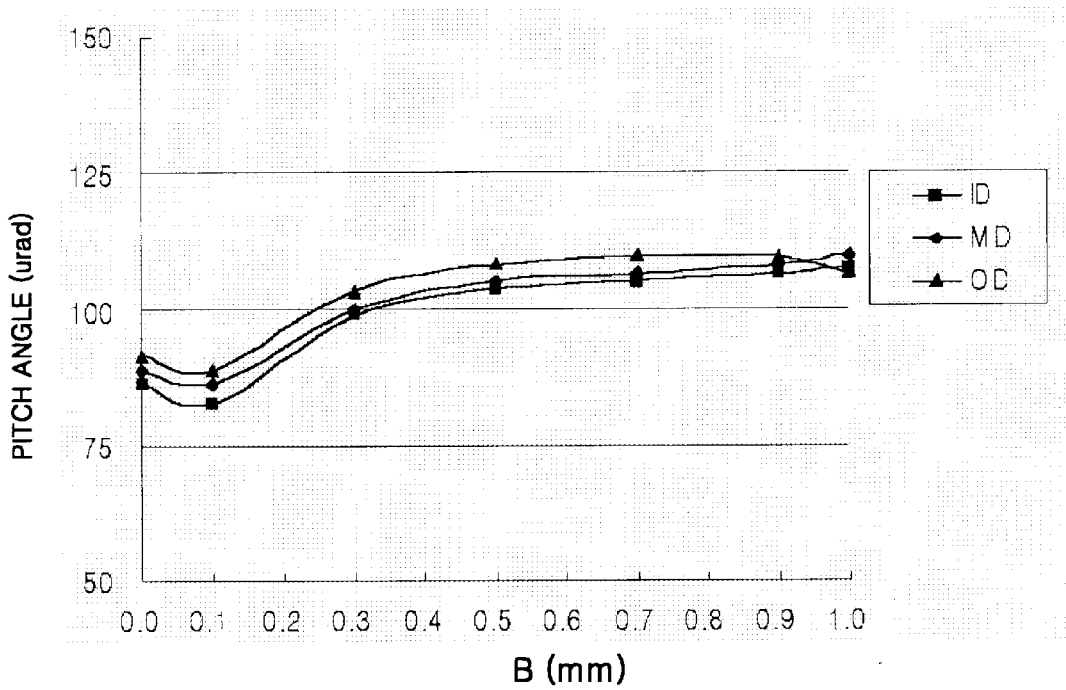
FIG. 14 is a graph showing the relation between a change in the pitch angle and a change in the length B of the protruding portion in the negative pressure air-bearing slider according to the third preferred embodiment of the present invention shown in FIGS. 12A and 12B.
Figure 15:
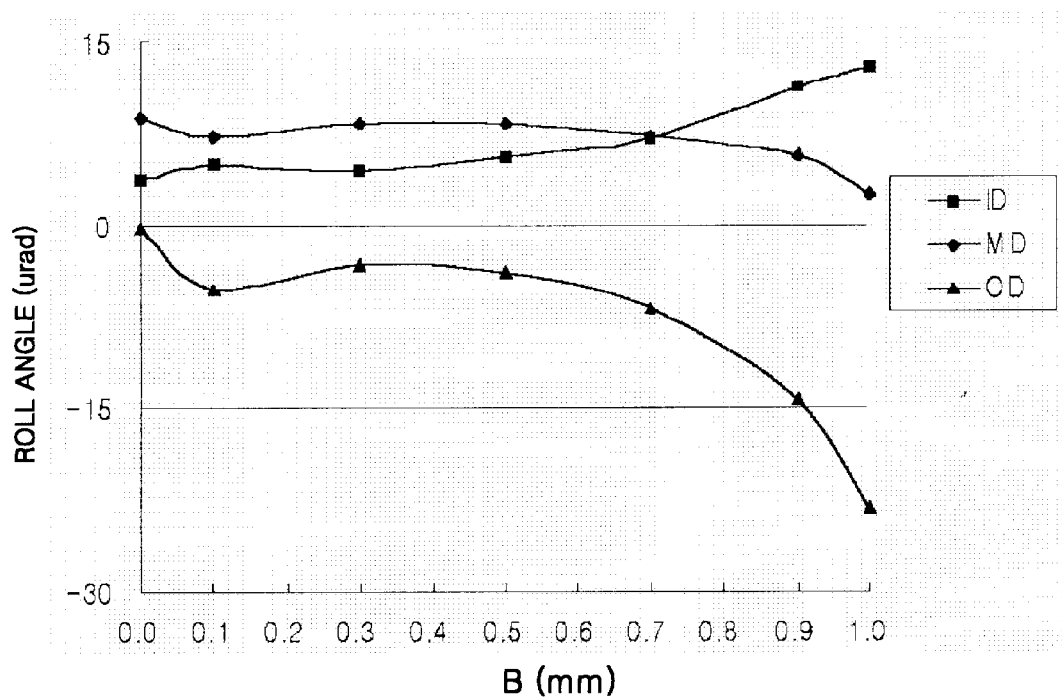
FIG. 15 is a graph showing the relation between a change in the roll angle and a change in the length B of the protruding portion in the negative pressure air-bearing slider according to the third preferred embodiment of the present invention shown in FIGS. 12A and 12B.

FIGS. 13 through 15 show the flying property of the slider with respect to the length B of the protruding portion 360'. As shown in the drawings, the flying height and the pitch angle do not much change but the difference in the amount of the roll angle according to the radius of the disc increases as the length B of the protruding portion 360' increases. When the protruding portion 360' is connected to the stepped portion 322 of a rail disposed at the center of the rear end portion, the flying height at the position OD sharply increases and the roll angle sharply decreases at the position OD. Considering all of the flying properties, it is appropriate that the length B of the protruding portion 360' is within 70% of the length of the slider. In FIGS. 13 through 15, ID, MD, and OD respectively indicate the innermost diameter, the middle diameter, and the outermost diameter of the disc where magnetic information is stored.

Figure 16:
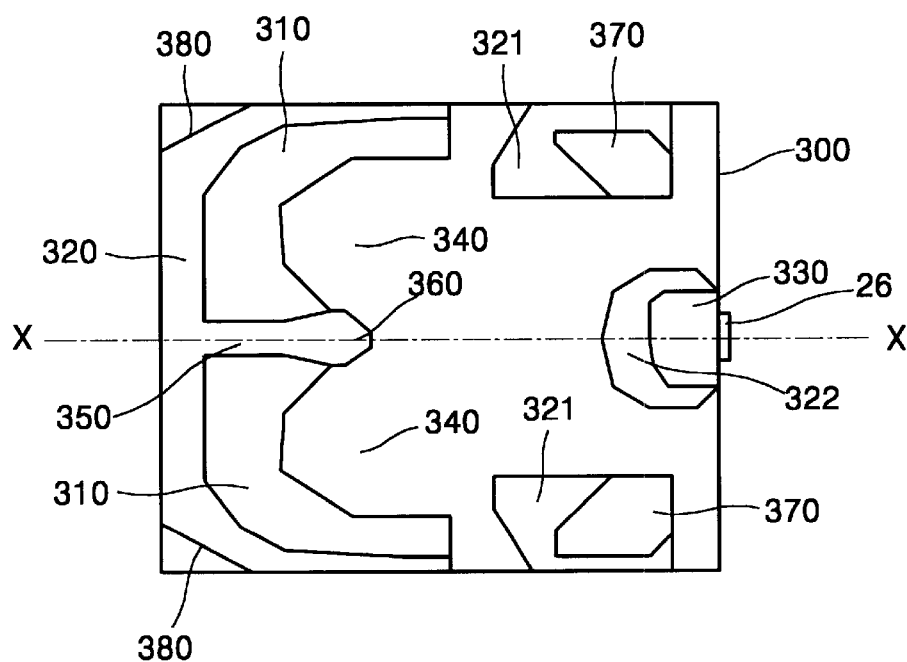
FIG. 16 is a plan view showing a negative pressure air-bearing slider according to a fourth preferred embodiment of the present invention.
Figure 17:
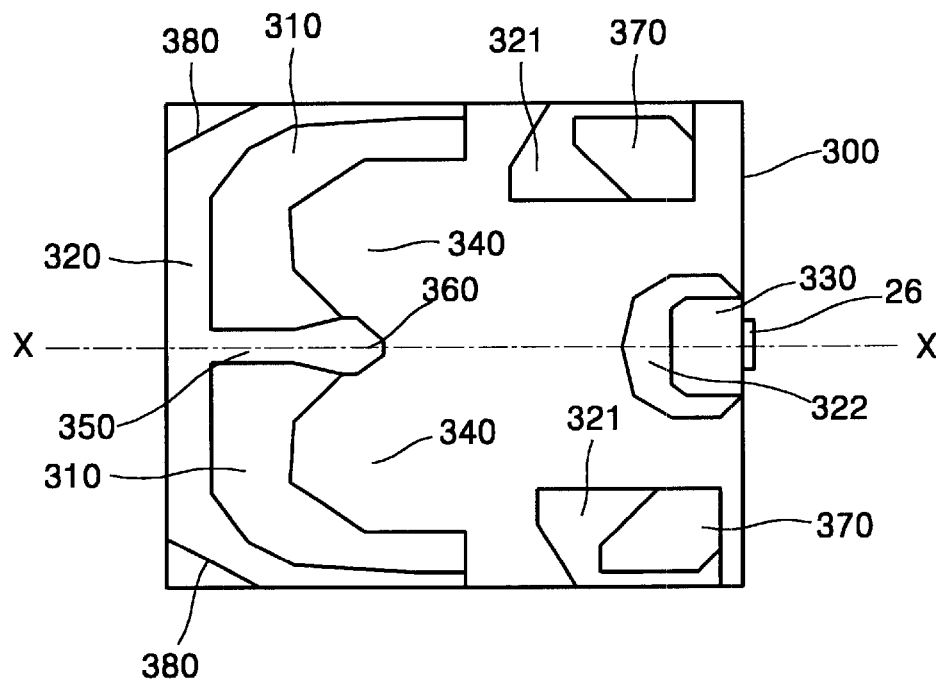
FIG. 17 is a plan view showing a negative pressure air-bearing slider according to a fifth preferred embodiment of the present invention.

FIGS. 16 and 17 show negative pressure air-bearing sliders according to fourth and fifth preferred embodiments of the present invention, in which the structures of asymmetrical sliders are shown. As shown in FIGS. 16 and 17, each rail base and each rail formed on the top surface thereof may be formed to be asymmetrical with respect to an X—X line along the first direction. This is for the asymmetrical adjustment of the amount of positive pressure and negative pressure at both sides with respect to the X—X line and modification into various shapes is possible. The asymmetrical structure can be applied to all elements formed on the body 300, in particular, to the above-mentioned first through third preferred embodiments.

Figure 18:
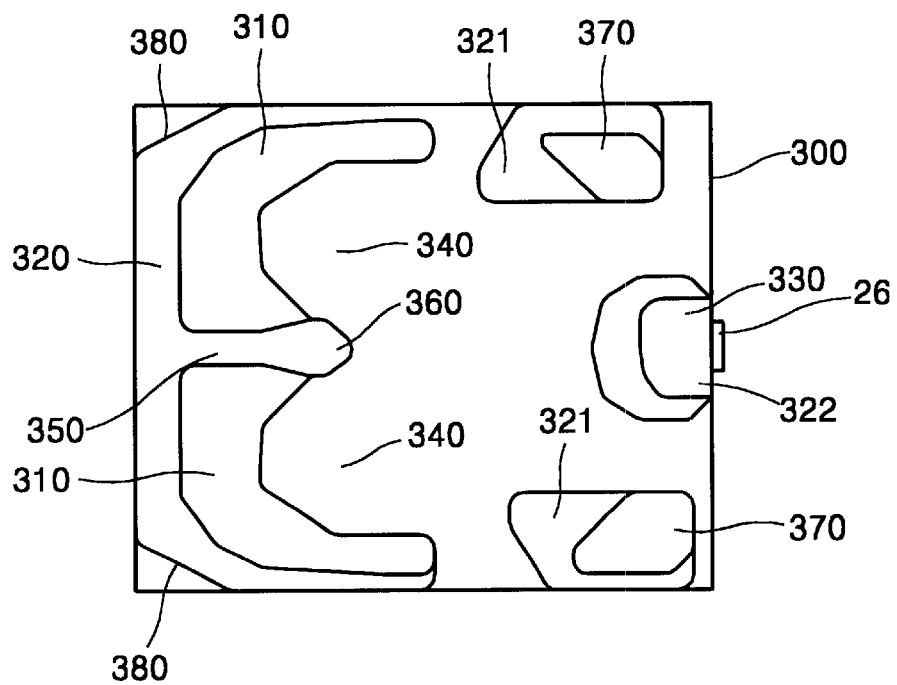
FIG. 18 is a plan view showing a negative pressure air-bearing slider according to a sixth preferred embodiment of the present invention.

FIG. 18 shows a slider having the asymmetrical structure as shown in FIGS. 16 and 17, in which the edge portions of the rail base and the rail formed on the body are formed to be curved. The above structure of forming the edge portions of the rail base and the rail to be curved may be applied to all of the above-described embodiments.

In the above-described embodiments, the difference between the rail base and the rail, that is, the depth of the stepped portion, is 0.1–1.0 μm, preferably, 0.1–0.4 μm. The height from the bottom of the negative pressure recess portion to the top surface of the rails formed on the rail bases, that is, the total depth of the recess is 1.0–10.0 μm, preferably, 1.0–4.0 μm. In the preferred embodiments of the present invention, the length of the slider in the first direction is 500–4000 μm and the width thereof is 50–100% of the length.

Figure 19A:
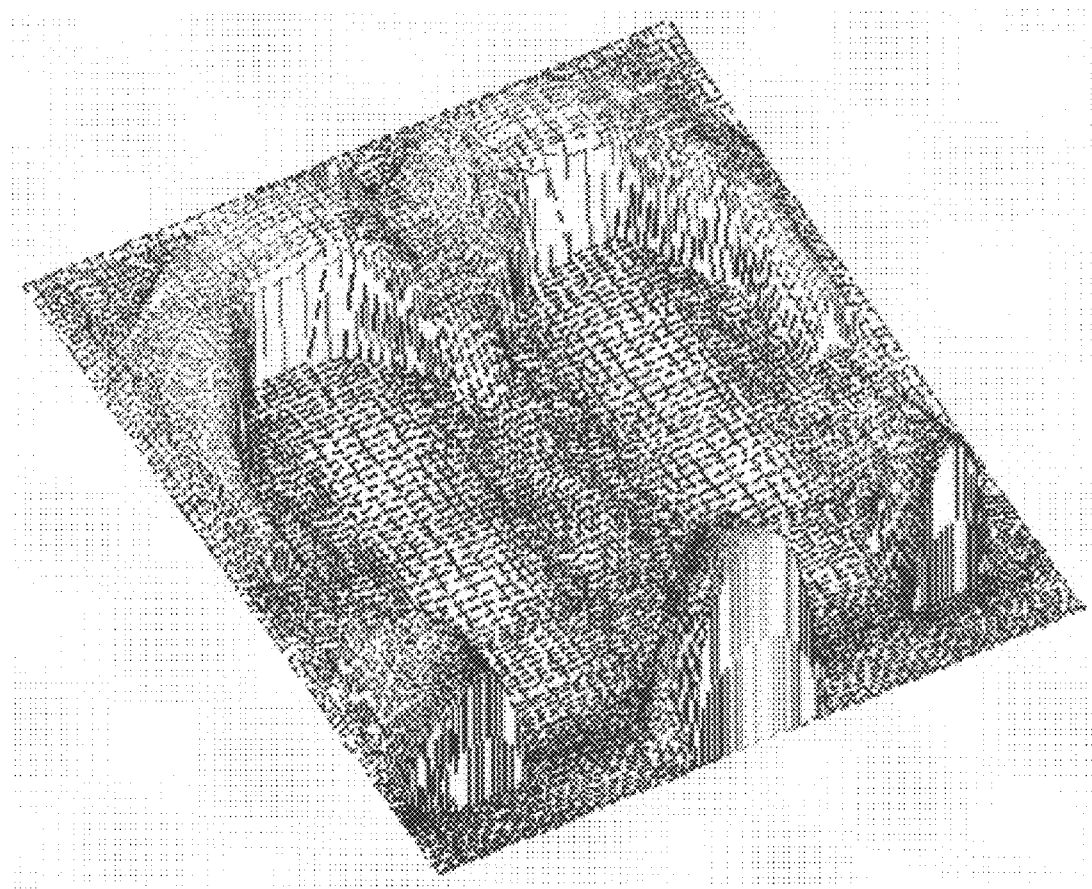
FIG. 19A is a 3-dimensional graph showing the distribution of pressure in the negative pressure air-bearing slider according to the present invention.
Figure 19B:
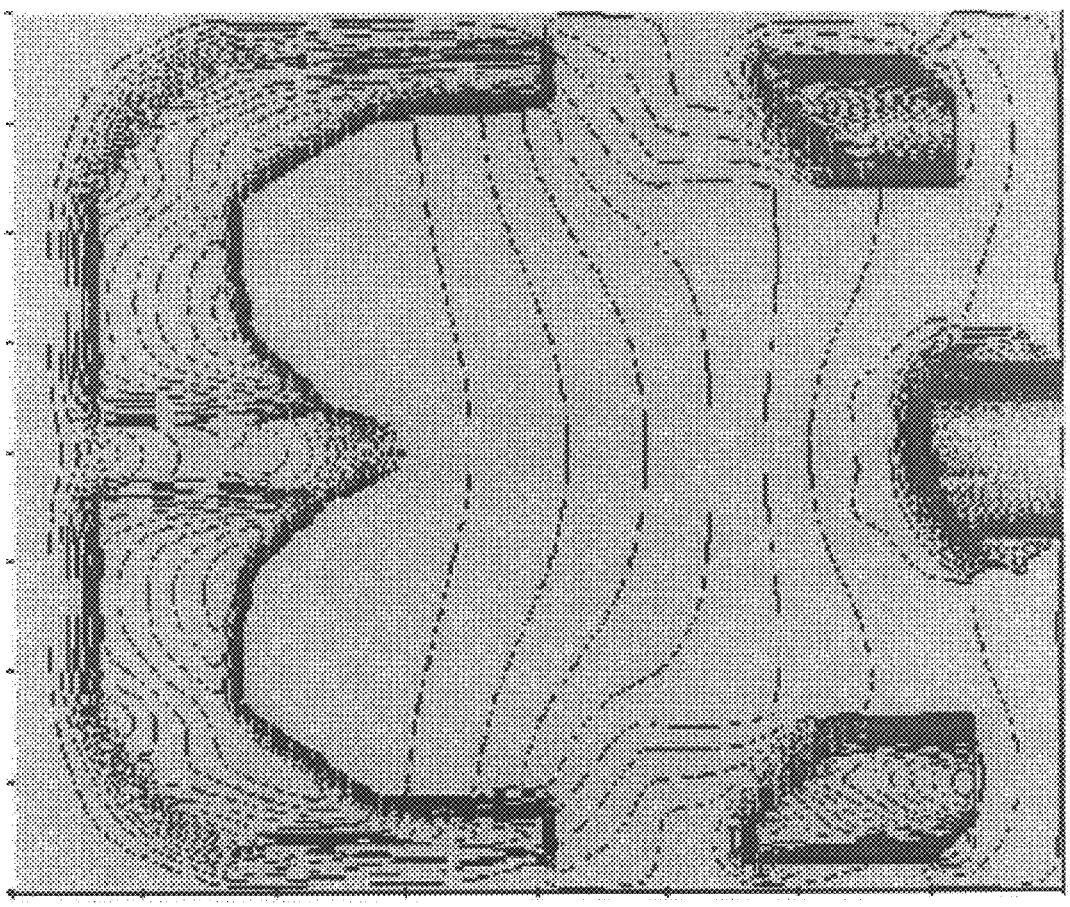
FIG. 19B is a 2-dimensional graph showing the distribution of pressure in the negative pressure air-bearing slider according to the present invention.

FIGS. 19A and 19B are 3-dimensional and 2-dimensional graphs showing the distribution of the pressure generated at the negative pressure air-bearing slider according to the first preferred embodiment of the present invention shown in FIG. 8.

Positive pressure starting from the outer stepped portion 320 of the first rail base to the first rail 310 increases in the direction along the length of the body and sharply decreases at the negative pressure recess portions, so that negative pressure is generated. Negative pressure is generated by and large at the center portion including the negative pressure recess portions of the slider. A great amount of positive pressure is formed at the second and third rails 370 and 330.

Figure 20:
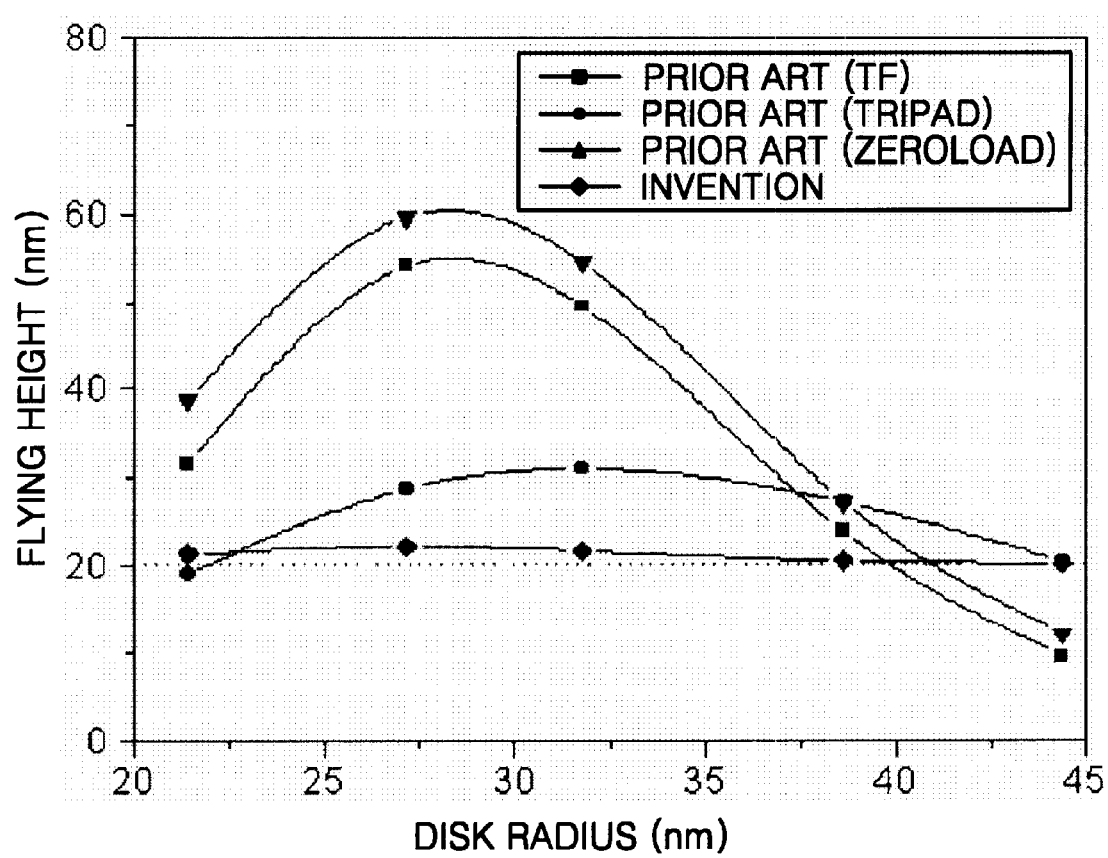
FIG. 20 is a graph showing the flying height of the three different conventional sliders and the slider of the present invention with respect to the disk radius.

FIG. 20 is a graph showing the change in the flying height with respect to the four sliders, that is, the present invention and the conventional TF, Tripad and Zeroload sliders. As shown in the drawing, the Zeroload slider has the largest change in the flying height and the amount of change decreases in the order of the taper flat slider (TF) and the tri-pad slider (Tripad). The flying height of the slider according to the present invention changes within the narrowest range.

Figure 21:
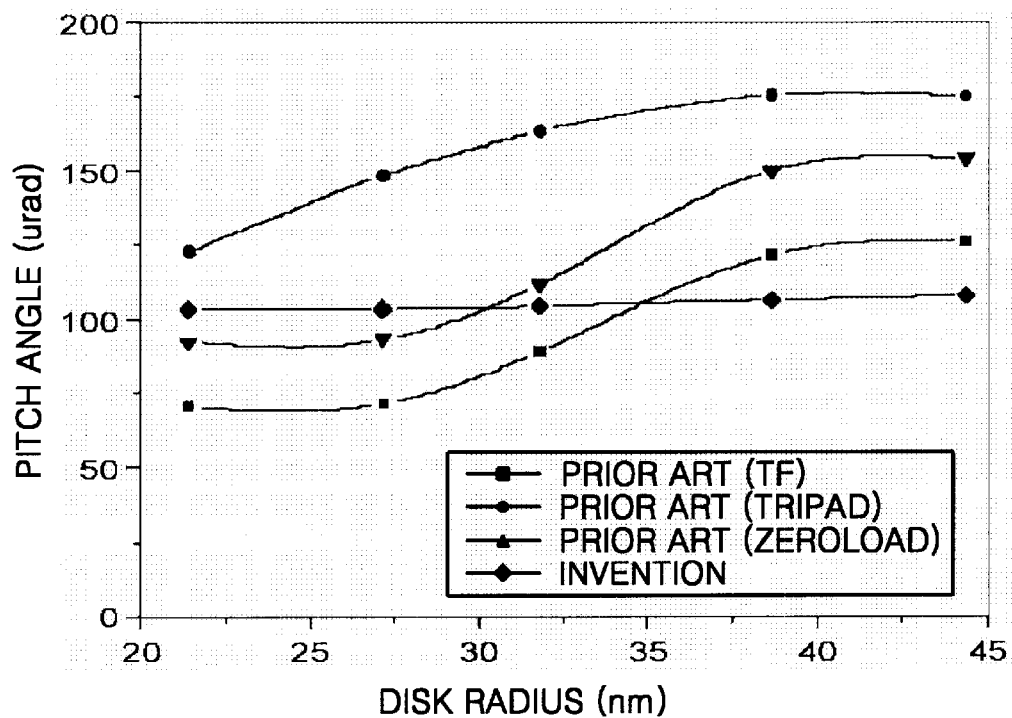
FIG. 21 is a graph showing the pitch angle of the three different conventional sliders and the slider of the present invention with respect to the disk radius.

FIG. 21 is a graph showing the change in the pitch angle with respect to the four sliders, that is, the present invention and the conventional TF, Tripad and Zeroload sliders. As shown in the drawing, the conventional TF, Tripad and Zeroload sliders, except for the slider of the present invention, changes much in the pitch angle. Accordingly, the slider according to the present invention shows the most stable change in the pitch angle, and in particular, the present slider maintains an almost constant value.

Figure 22:
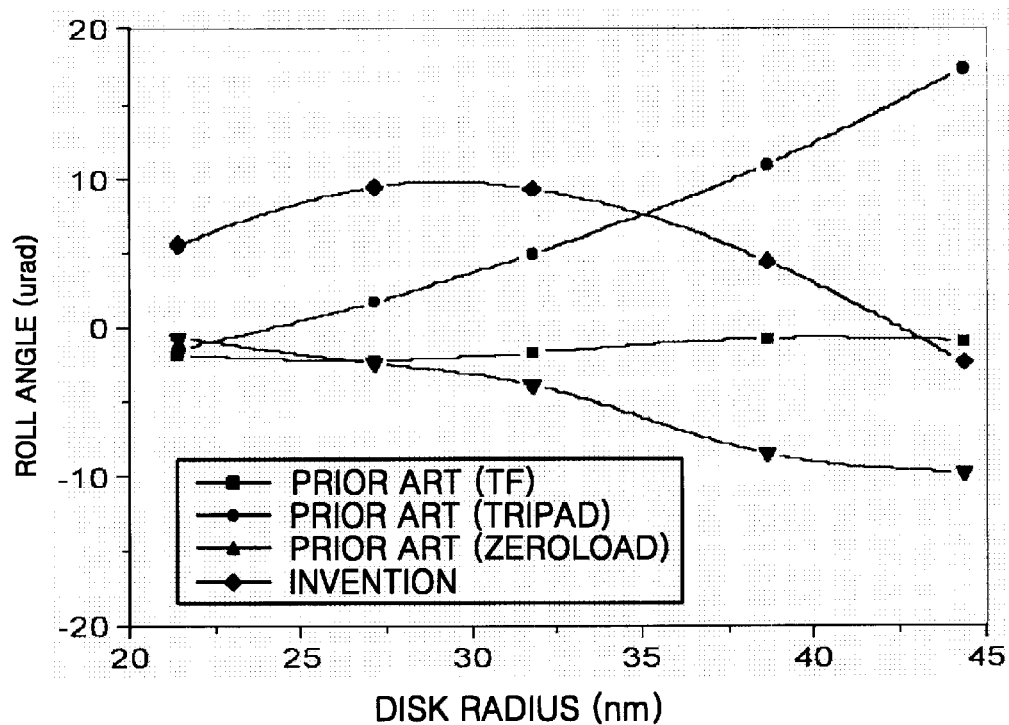
FIG. 22 is a graph showing the roll angle of the three different conventional sliders and the slider of the present invention with respect to the disk radius.

FIG. 22 is a graph showing the change in the roll angle with respect to the four sliders, that is, the present invention and the conventional TF, Tripad and Zeroload sliders. As shown in the drawing, while all of the conventional sliders show much changes in the roll angle within a considerably large range, the present slider maintains a stable and very small change in the roll angle.

Figure 23:
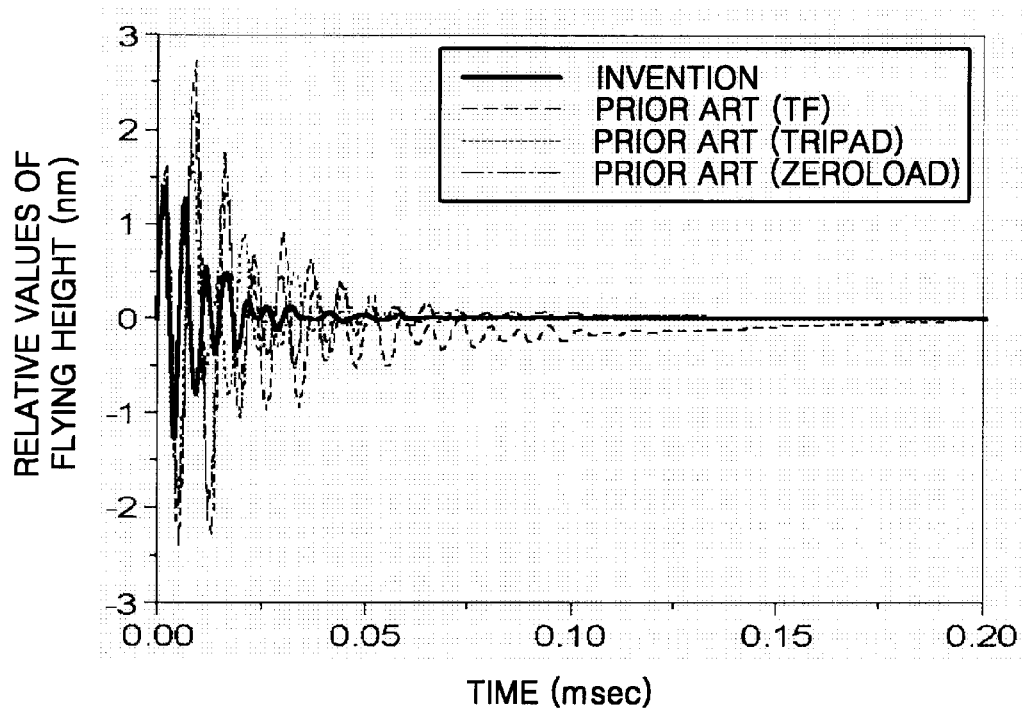
FIG. 23 is a graph showing a change of relative values of the flying height of sliders when an impact is applied to the three different conventional sliders and the slider according to the present slider.

FIG. 23 is a graph showing a change of relative values of the flying height of sliders when an impact is applied to the conventional TF, Tripad, and Zeroload sliders and the slider according to the present slider. As shown in FIG. 23, when an impact is applied, every slider shows a considerable change in the relative value of the flying height. However, the slider according to the present invention is stabilized very quickly compared to other conventional sliders.

Figure 24:
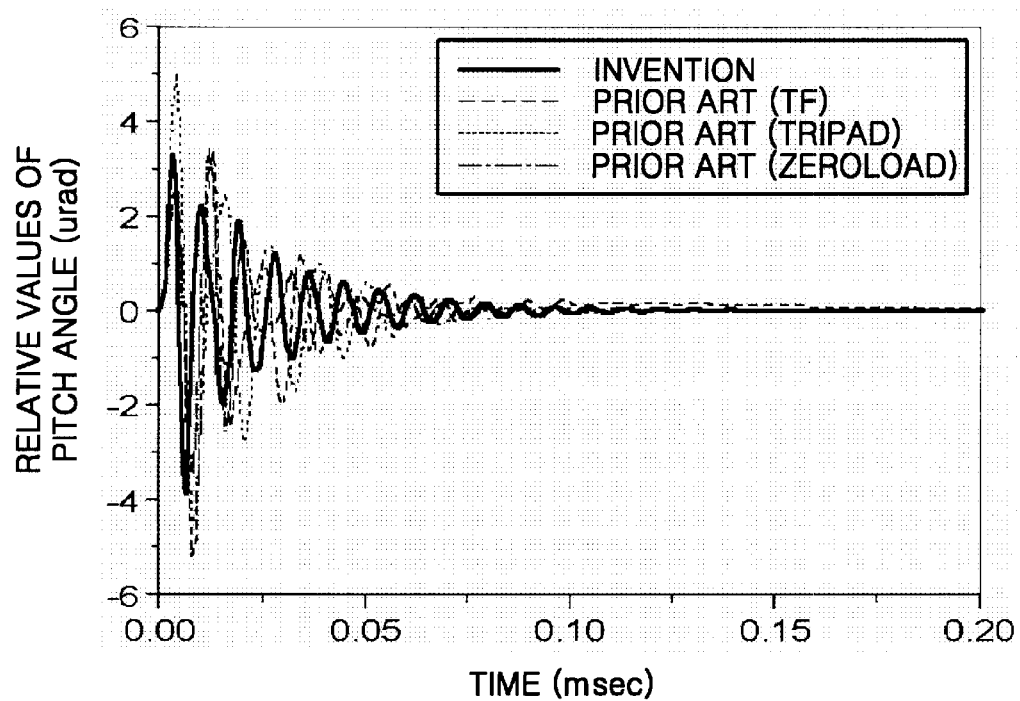
FIG. 24 is a graph showing a change of relative values of the pitch angle of sliders when an impact is applied to the three different conventional sliders and the slider according to the present slider.

FIG. 24 is a graph showing a change of relative values of the pitch angle of sliders when an impact is applied to the conventional TF, Tripad, and Zeroload sliders and the slider according to the present slider. As shown in FIG. 24, when an impact is applied, every slider shows a considerable change in the relative value of the pitch angle. However, the slider according to the present invention is stabilized very quickly compared to other conventional sliders.

Figure 25:
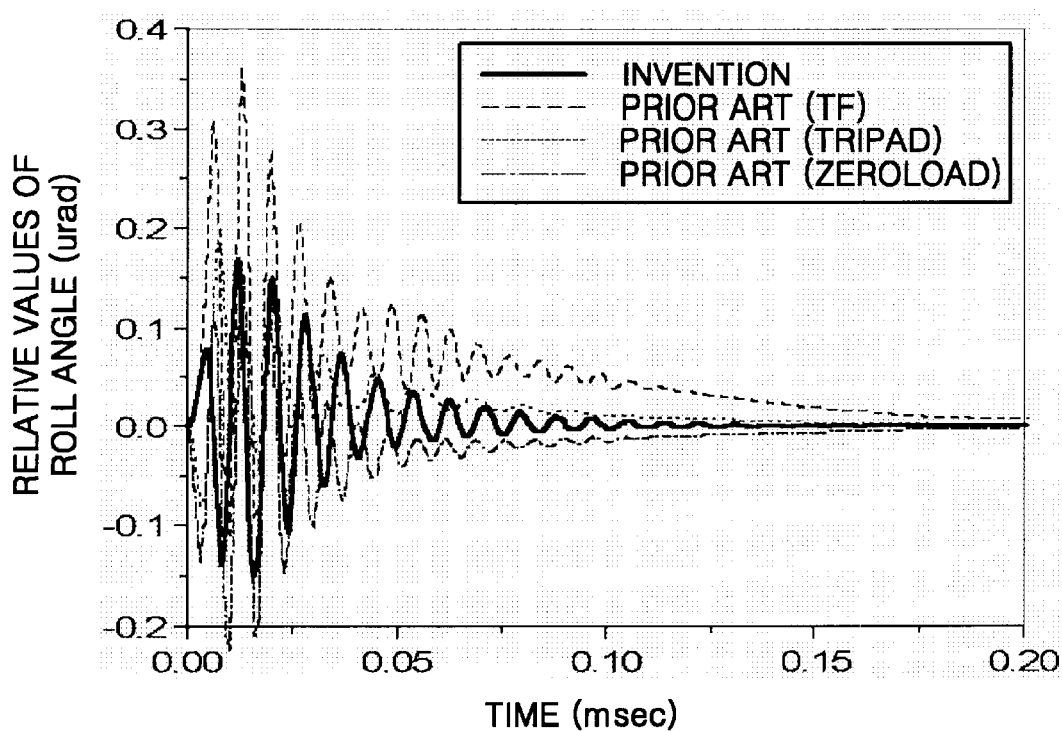
FIG. 25 is a graph showing a change of relative values of the roll angle of sliders when an impact is applied to the three different conventional sliders and the slider according to the present invention.

FIG. 25 is a graph showing a change of relative values of the roll angle of sliders when an impact is applied to the conventional TF, Tripad, and Zeroload sliders and the slider according to the present slider. As shown in FIG. 25, when an impact is applied, every slider shows a considerable change in the relative value of the roll angle. However, the slider according to the present invention is stabilized very quickly compared to other conventional sliders.

In the above characteristics of the sliders with reference to FIGS. 20 through 25, the conventional Zeroload slider shows a very unstable flying property while the slider according to the present invention is very stable.

Figure 26:
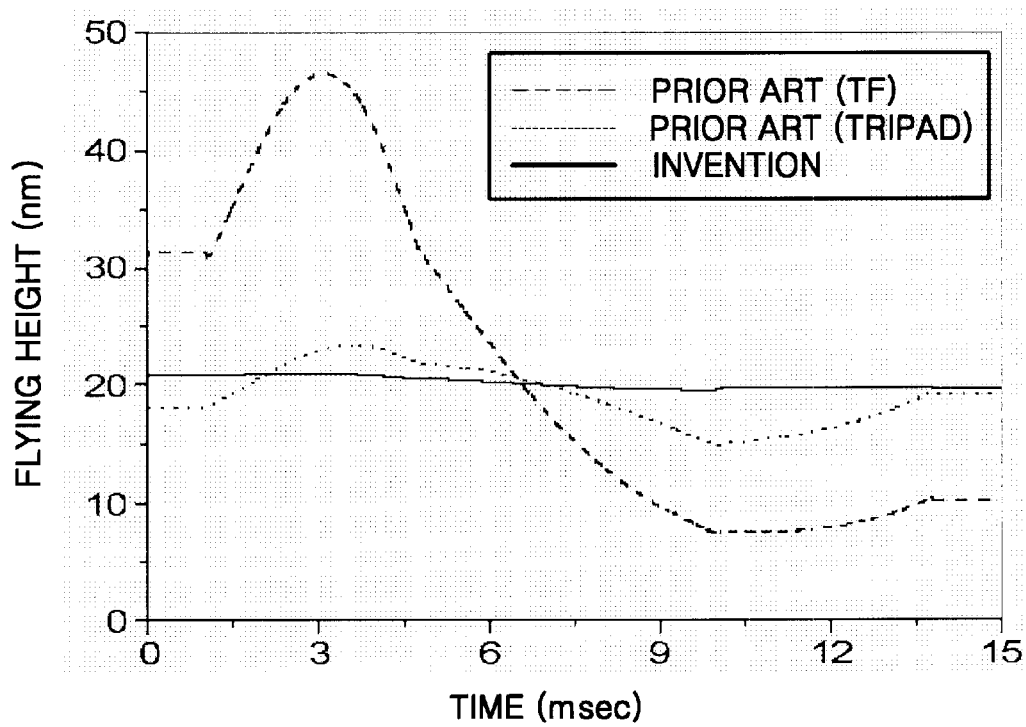
FIG. 26 is a graph showing a change in the flying height of sliders during track seek with respect to the three different conventional sliders and the slider according to the present invention.
Figure 27:
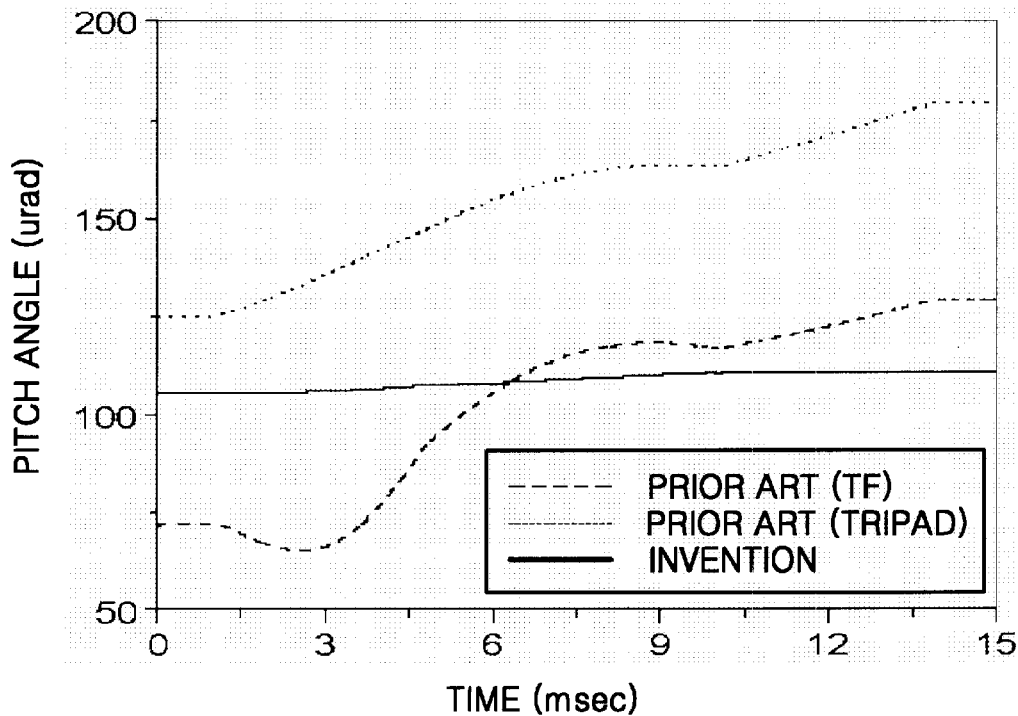
FIG. 27 is a graph showing a change in the pitch angle of sliders during track seek with respect to the three different conventional sliders and the slider according to the present invention.
Figure 28:
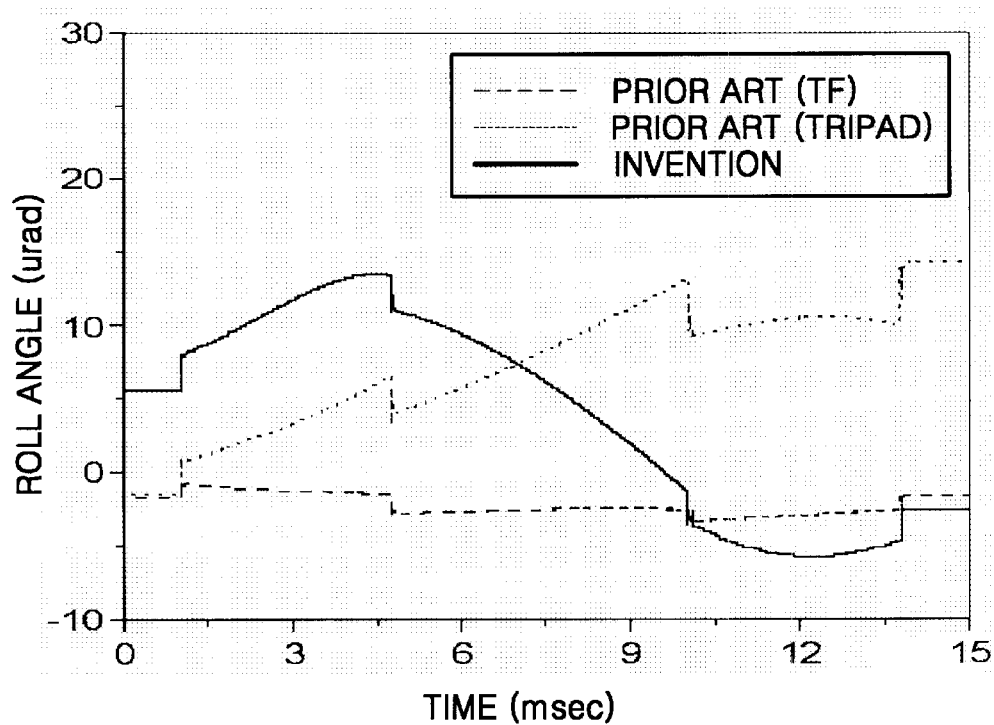
FIG. 28 is a graph showing a change in the roll angle of sliders during track seek with respect to the three different conventional sliders and the slider according to the present invention.

FIG. 26 shows a change in the flying height during track seek with respect to the three sliders of the TP slider, the Tripad slider and the present slider. FIG. 27 shows a change in the pitch angle during track seek with respect to the three sliders of the TP slider, the Tripad slider and the present slider. FIG. 28 shows a change in the roll angle during track seek with respect to the three sliders of the TP slider, the Tripad slider and the present slider. As can be seen from FIGS. 26 through 28, the slider according to the present invention shows a stable flying attitude in all the properties.

As described above, the negative pressure air-bearing slider according to the present invention maintains a constant flying height in the overall area of a disc, a pitch angle within an appropriate range in the overall area of a disc, and minimizes the size of the roll angle in the overall area of a disc and makes it constant. In particular, dynamic stability is provided to the external interference and track seek and the amount of contaminant particles intruding into the head-disc interface is minimized, so that a phenomenon in which the intruding contaminant particles are accumulated in the negative pressure recess portions can be effectively prevented.

It is noted that the present invention is not limited to the preferred embodiment described above, and it is apparent that variations and modifications by those skilled in the art can be effected within the spirit and scope of the present invention defined in the appended claims.

What is claimed is:

1. A negative pressure air-bearing slider comprising:
  a body flying in a first direction along a track of a disc where information is recorded while being raised to a predetermined height;
  a plurality of rails provided at the bottom of the body corresponding to a surface of the disc;
  an air inflow channel arranged at the bottom of the body in the first direction and having an air inflow portion at the leading end portion of the slider and an air exhaust portion at the inside of the body; and
  a pair of negative pressure recess portions provided at the air exhaust portion of the air inflow channel to be arranged in a second direction perpendicular to the first direction with respect to the air inflow channel, wherein a first rail base having a W shape which is disposed at the front side of the slider in the first direction, encompassing the negative pressure recess portion pair, and having a protruding portion extending between the negative pressure recess portions at the center of the slider, and the plurality of rails correspond to each of the negative pressure recess portions and are provided on the first rail base.

2. The slider as claimed in claim 1, wherein an upper surface of the protruding portion is disposed lower than the plurality of rails, and the air inflow channel is provided at the upper surface of the protruding portion.

3. The slider as claimed in claim 1, wherein the plurality of rails are formed on a portion of the upper surface of the first rail base, and a front stepped portion is provided at the upper surface of the first rail base at the leading end portion of the plurality of rails.

4. The slider as claimed in claim 3, wherein the plurality of rails are formed on a portion of the upper surface of the first rail base, and a rear stepped portion is provided at the upper surface of the first rail base in the rear of the plurality of rails facing the negative pressure recess portions.

5. The slider as claimed in claim 3, wherein a second rail base is provided in the rear of each of both sides of the first rail base at a constant interval, and a second rail is provided at each of the second rail bases.

6. The slider as claimed in claim 5, wherein the second rail is separated a predetermined distance from the read end of the body.

7. The slider as claimed in claim 1, wherein the plurality of rails are formed on a portion of the upper surface of the first rail base, and a rear stepped portion is provided at the upper surface of the first rail base in the rear of the plurality of rails facing the negative pressure recess portions.

8. The slider as claimed in claim 7, wherein a second rail base is provided in the rear of each of both sides of the first rail base at a constant interval, and a second rail is provided at each of the second rail bases.

9. The slider as claimed in claim 8, wherein a third rail is provided between the second rails.

10. The slider as claimed in claim 9, wherein the second rail is separated a predetermined distance from the read end of the body.

11. The slider as claimed in claim 1, wherein an inclined portion is formed at each corner of both sides of the front side of the first rail base.

12. The slider as claimed in claim 1, wherein a second rail base is provided in the rear of each of both sides of the first rail base at a constant interval, and a second rail is provided at each of the second rail bases.

13. The slider as claimed in claim 12, wherein a third rail is provided between the second rails.

14. The slider as claimed in claim 12, wherein the second rail is separated a predetermined distance from the rear end of the body.

15. A negative pressure air-bearing slider comprising:

a body;

a first rail on a first rail base at the leading end portion of the body in a first direction, having a pair of first portions arranged at both sides in the first direction, a second portion in a second direction of which both ends are connected to the leading end portions of the first portions, and an air inflow channel in the first direction provided at the central portion of the second portion, wherein a pair of negative pressure recess portions are provided at both sides in the second direction at a predetermined interval with respect to the air inflow channel in an inner space between the first portions and the second portion; and a pair of second rails provided at both sides of the rear of the body of the slider in the first direction, wherein the first rail base has a protruding portion having a predetermined height at a middle portion thereof, the first rail base having a W shape and encompassing the negative pressure recess portions, and the air inflow channel is provided on the upper surface of the first rail base.

16. The slider as claimed in claim 15, wherein a third rail disposed at the central portion of the rear side in the first direction is interposed between the second rails.

17. The slider as claimed in claim 15, wherein the first rail is formed on a portion of the upper surface of the first rail base, and a stepped portion is formed by the upper surface of the first rail base where the first rail is not formed at any of the front and rear sides of the first rail base.

18. The slider as claimed in claim 17, wherein the length of the protruding portion has a value not more than 70% of the length of the body.

19. The slider as claimed in claim 15, wherein the length of the protruding portion has a value not more than 70% of the length of the body.

* * * * *